(12) United States Patent
Sullivan et al.

(10) Patent No.: US 7,673,462 B2
(45) Date of Patent: Mar. 9, 2010

(54) METHOD AND APPARATUS CONTROLLING DUAL HEAT TRANSFERS FOR INTERNAL THERMAL ZONE OF A HARD DISK DRIVE

(75) Inventors: Michael Sullivan, Fremont, CA (US); George Tyndall, San Jose, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 722 days.

(21) Appl. No.: 11/453,267

(22) Filed: Jun. 13, 2006

(65) Prior Publication Data

US 2007/0153424 A1  Jul. 5, 2007

Related U.S. Application Data

(63) Continuation-in-part of application No. 11/323,624, filed on Dec. 30, 2005.

(51) Int. Cl.
  *F25B 21/02* (2006.01)
(52) U.S. Cl. .................................. 62/3.7; 62/259.2
(58) Field of Classification Search ............... 62/3.1, 62/3.2, 3.7, 259.2, 87, 401
  See application file for complete search history.

(56) References Cited

U.S. PATENT DOCUMENTS 7,130,160 B2 *  10/2006  Kwon et al. ............. 360/294.7

* cited by examiner

*Primary Examiner*—Melvin Jones
(74) *Attorney, Agent, or Firm*—Earle Jennings; GSS Law Group

(57) ABSTRACT

Method and apparatus (thermal controller) for controlling a thermoelectric device to affect the temperature of an internal thermal zone in a hard disk drive to enable a first heat transfer from an internal heat transfer interface included in a thermal interface to an exterior heat transfer interface thermally coupling to the exterior of said hard disk drive, and applying to enable a second heat transfer from the exterior heat transfer interface to the internal heat transfer interface. The thermoelectric device may include the thermal controller. An external cover may include the thermal controller. The hard disk drive includes the thermal controller directing the thermoelectric device. Systems including at least one of the hard disk drives. Manufacturing these apparatus and these apparatus as products of these processes are part of the invention.

21 Claims, 17 Drawing Sheets

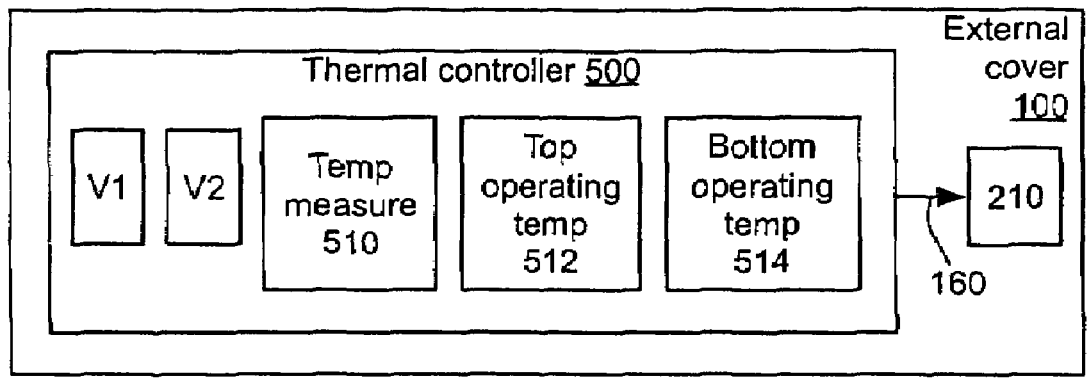
Fig. 9A
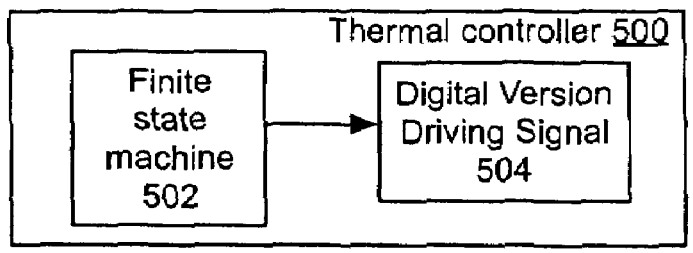
Fig. 9B
Fig. 9C
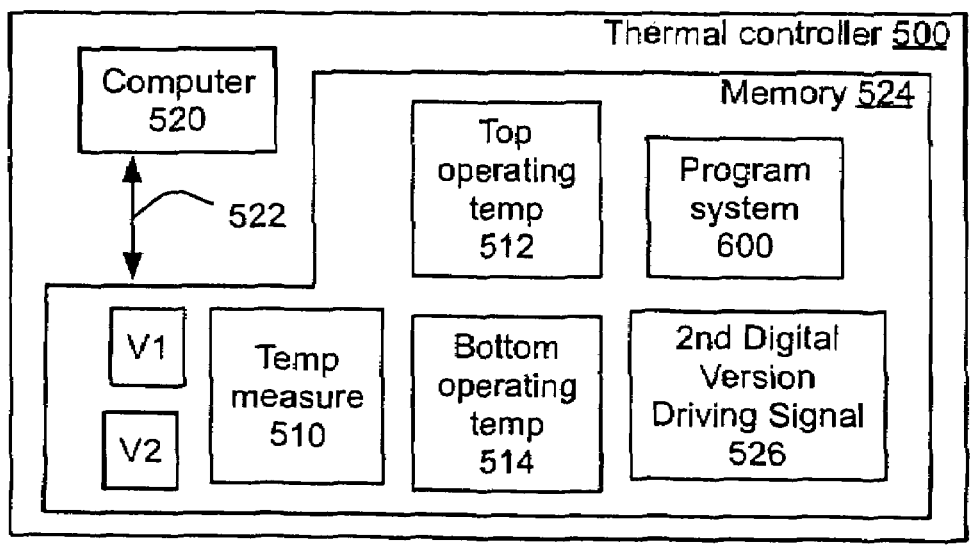
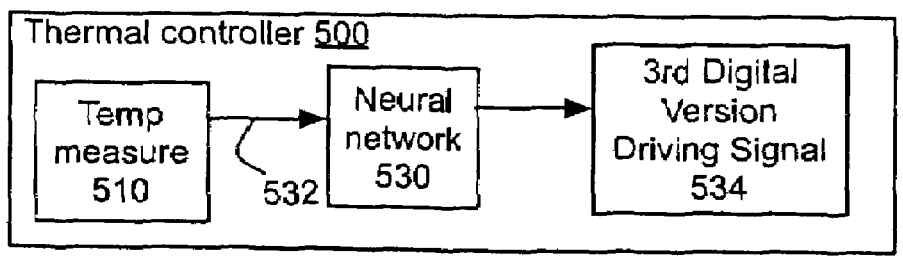
Fig. 9D

Fig. 11A
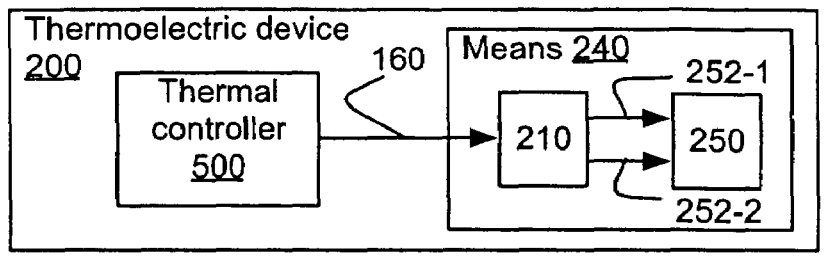
Fig. 11B
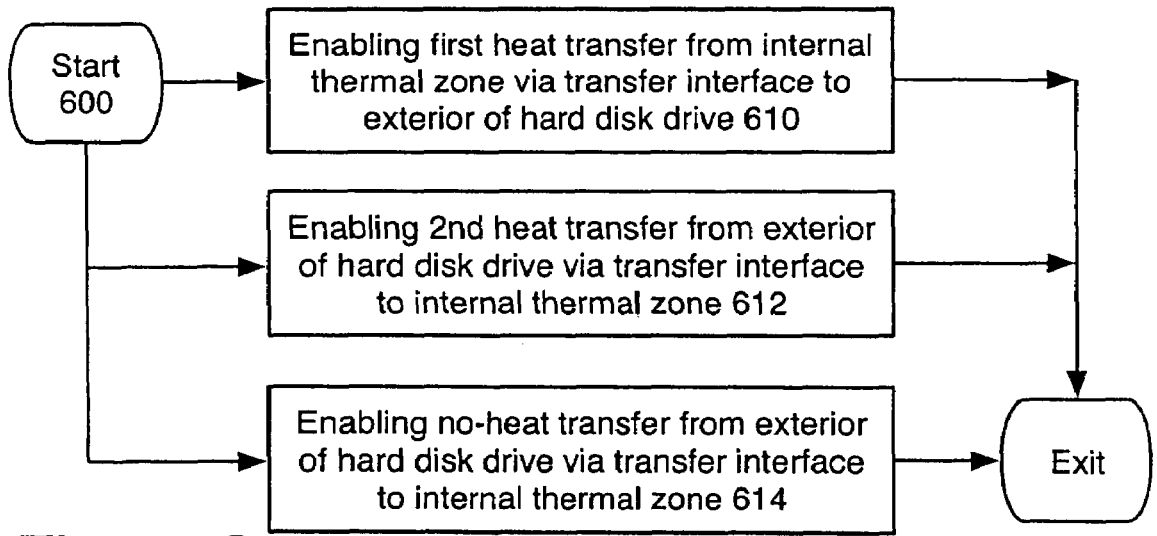
Fig. 11C
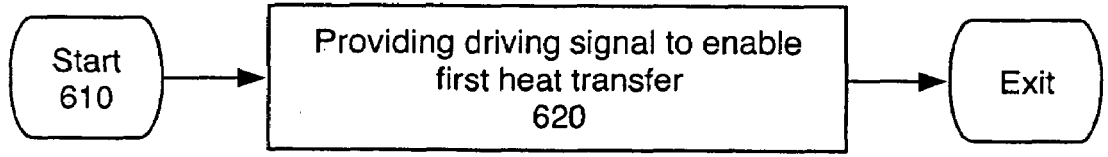
Fig. 11D
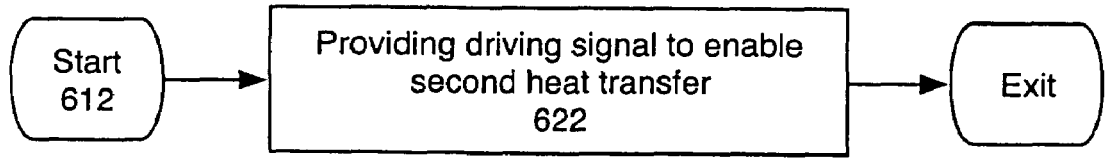
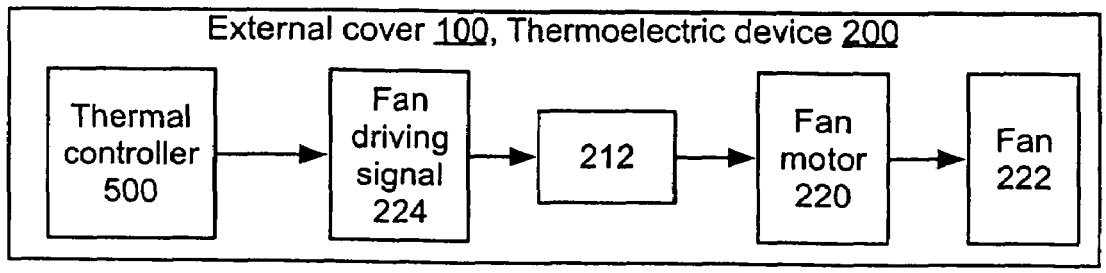
Fig. 11E

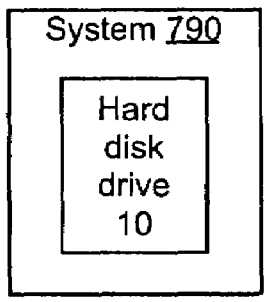
Fig. 13A
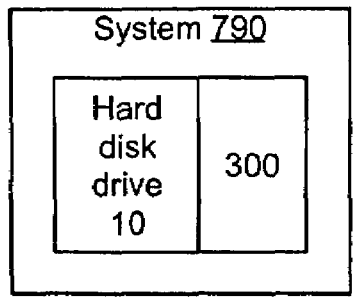
Fig. 13B
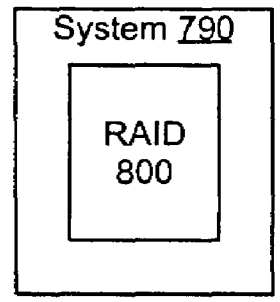
Fig. 13C
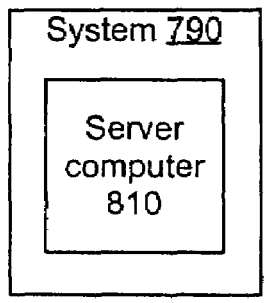
Fig. 13D
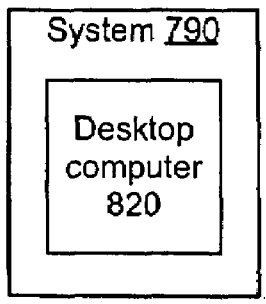
Fig. 13E
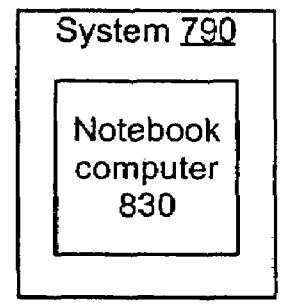
Fig. 13F
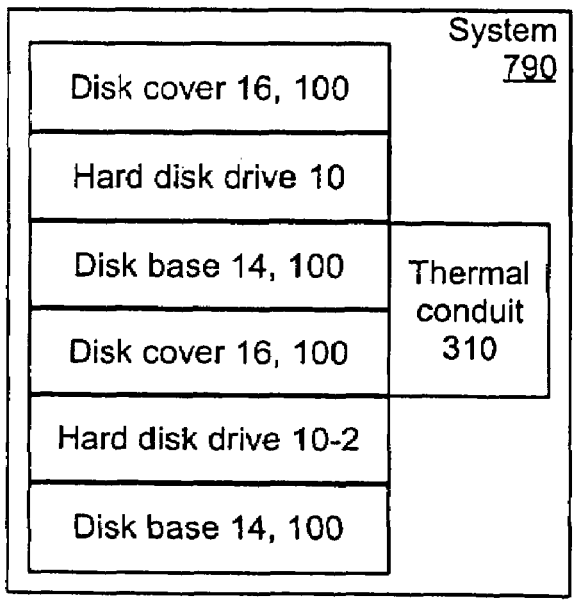
Fig. 13G
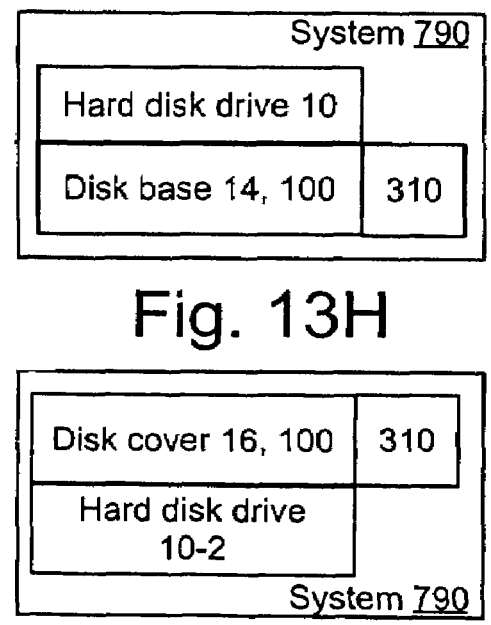
Fig. 13H
Fig. 13I

METHOD AND APPARATUS CONTROLLING DUAL HEAT TRANSFERS FOR INTERNAL THERMAL ZONE OF A HARD DISK DRIVE

CROSS REFERENCE TO RELATED APPLICATIONS

This patent application is a continuation-in-part application of pending patent application Ser. No. 11/323,624, filed Dec. 30, 2005, which pending application is incorporated herein by reference in its entirety.

TECHNICAL FIELD

This invention relates to hard disk drive components, in particular, to mechanisms to regulate and control the internal ambient temperature inside a hard disk drive.

BACKGROUND OF THE INVENTION

Contemporary hard disk drives are faced with severe challenges. They must operate wherever their users decide to operate them, in environments where the hard disk drive must operate outside of room temperature.

When a hard disk drive is too hot, many operating problems develop. Heat tends to decay the material of the rotating disk surfaces on which the data is stored. The mechanical component tolerances degrade due to differences in their coefficients of thermal expansion. The pressure at the air bearing surface will change due to the high temperature. The breakdown of lubricants used in the hard disk drive is accelerated. The sensitivities due to thermal asperities during read operations is increased. The effects of thermal pole tip protrusion are maximized.

When the hard disk drive is too cold, other operating problems develop. The thermal coercivity of the disk media is lowered, degrading the ability to write data to tracks on the disk surfaces. The pressure at the air bearing surface will change due to the low temperature. It takes longer to start up the hard disk drive when it is cold, due to the viscosity of the lubricant in the spindle motor. The effects of thermal pole tip protrusion are minimized.

Today, many hard disk drives include some device measuring the internal temperature, and in some situations, the operating parameters of the hard disk drive are altered based upon the measured internal temperature. In many hard disk drives, at least part of the exterior face of the disk base is configured as a primitive thermal transfer element. However, no hard disk drives are known to be able to adjust their internal temperature. What is needed is a hard disk drive able adjust its internal temperature toward its optimal operating temperature range.

SUMMARY OF THE INVENTION

Definitions: Heat transfer interface as used herein means any passageway for heat transfer. Thermal-couple as used herein refers to a layer of material between adjacent transfer interfaces which assists the transfer of heat between the transfer interfaces; typically but not necessarily an adhesive material. Thermal-coupling as used herein describes the action of providing a passageway for heat transfer.

The invention includes controlling a thermoelectric device to affect the temperature of an internal thermal zone in a hard disk drive. This includes Applying a first potential difference between an electrical contact pair to enable a first heat transfer from an internal heat transfer interface included in a thermal interface to an exterior heat transfer interface thermally-coupling to the exterior of the hard disk drive to cool the hard disk drive.

The thermal interface is thermally coupled to the internal thermal zone of the hard disk drive.

And applying a second potential difference between the electrical contact pair to enable a second heat transfer from the exterior heat transfer interface to the internal heat transfer interface to heat the hard disk drive.

The sign of the first potential difference is the opposite of the sign of the second potential difference.

The first heat transfer and the second heat transfer are the products of this process.

The internal thermal zone may preferably include at least one disk surface, and may preferably further include all the disk surfaces and sliders moving near the disk surfaces.

Controlling the thermoelectric device may be based upon a temperature measure.

Applying the first potential difference may include applying the first potential difference between the electrical contact pair, when the temperature measure is above a top operating temperature.

The temperature measure may be above the top operating temperature when the temperature measure is greater than the top operating temperature.

Alternatively, the temperature measure may be above the top operating temperature when the temperature measure is greater than or equal to the top operating temperature.

Applying the second potential difference may include applying the second potential difference when the temperature measure is below the bottom operating temperature.

The temperature measure may be below the bottom operating temperature, when the temperature measure is less than the bottom operating temperature.

Alternatively, the temperature measure may be below the bottom operating temperature, when the temperature measure is less than or equal to the bottom operating temperature.

A driving signal may be applied to the electrical contact pair.

Applying a first potential difference between an electrical contact pair to enable a first heat transfer from an internal heat transfer interface included in a thermal interface to an exterior heat transfer interface thermally coupling to the exterior of the hard disk drive.

And applying a second potential difference between the electrical contact pair to enable a second heat transfer from the exterior heat transfer interface to the internal heat transfer interface.

A thermal controller may implement the control method. The thermal controller may include the following.

Means for applying the first potential difference between the electrical contact pair to enable the first heat transfer from the internal heat transfer interface to the exterior heat transfer interface.

And means for applying the second potential difference between the electrical contact pair to enable the second heat transfer from the exterior heat transfer interface to the internal heat transfer interface.

The thermal controller may also receive a signal from the drive firmware to enable or disable one or both of these means.

The thermal controller may receive the temperature measure for the internal thermal zone of the hard disk drive.

The means for applying the first potential difference may further include

A first means for forcing the driving signal toward the first potential difference between the electrical contact pair, when the temperature measure is above the top operating temperature.

The means for applying the second potential difference may further include

A second means for forcing the driving signal toward the second potential difference between the electrical contact pair, when the temperature measure is below the lower operating temperature.

The thermal controller may include at least one of the following.

A finite state machine generating a digital version of the driving signal based upon the temperature measure.

A computer accessibly coupled to a memory containing a program system including at least one program step generating a second digital version of the driving signal based upon the temperature measure.

A neural network responding to the temperature measure to generate a third digital version of the driving signal.

The thermal controller may further include exactly one of the finite state machine, the computer and the neural network.

The program system may include at least one of the following program steps

Forcing the second digital version of the driving signal toward the first potential difference.

And forcing the second digital version of the driving signal toward the second potential difference.

The program system may include a program step implementing the neural network responding to the temperature measure to generate the third digital version of the driving signal.

The thermal controller may include an analog circuit generating the driving signal based upon at least one of the temperature measure, the digital version of the driving signal, the second digital version of the driving signal, and the third digital version of the driving signal. The analog circuit may further generate the driving signal based upon exactly one of these.

The analog circuit may include one or both of the following or their refinements as discussed elsewhere in this document.

Means for applying the first potential difference between the electrical contact pair to enable the first heat transfer from the internal heat transfer interface to the exterior heat transfer interface.

And means for applying the second potential difference between the electrical contact pair to enable the second heat transfer from the exterior heat transfer interface to the internal heat transfer interface.

Pulse-width-modulation may be employed.

Forcing the driving signal toward the first potential difference may preferably include pulse-width-modulating the driving signal between the first potential difference and zero volts, preferably based upon the temperature measure.

Forcing the driving signal toward the second potential difference may preferably include pulse-width-modulating the driving signal between the second potential difference and zero volts, preferably based upon the temperature measure.

Manufacturing the thermal controller may include at least one of the following:

Providing the means for applying the first potential difference and the means for applying the second potential difference to at least partly create the thermal controller.

Providing

A means for forcing a driving signal toward the first potential difference between the electrical contact pair, when a temperature measure is above a top operating temperature, A means for forcing the driving signal toward the second potential difference between the electrical contact pair, when the temperature measure is below a lower operating temperature to at least partly create the thermal controller.

Providing at least one finite state machine generating a digital version of the driving signal to at least partly create the thermal controller.

Providing at least one computer generating a second digital version of the driving signal to at least partly create the thermal controller.

Providing a neural network generating a third digital version of the driving signal to at least partly create the thermal controller.

Providing the program system in the memory to at least partly create the thermal controller.

Providing the analog circuit to at least partly create the thermal controller.

The thermal controller is a product of the manufacturing process.

The thermoelectric device may include the thermal controller providing the driving signal to the electrical contact pair of the thermoelectric device.

The thermoelectric device may include at least one semiconductor device acting as a heat pump and using the transfer interface to thermally-affect the internal thermal zone.

The invention includes an external cover of the hard disk drive may include the thermal controller receiving a temperature measure of the internal thermal zone and providing a driving signal to the first electrical contact pair of the thermoelectric device.

The external cover may further include the thermoelectric device.

A disk cover and/or a disk base may serve as the external cover for the hard disk drive.

The external cover may further include a second electrical contact pair driving a fan motor powering a fan to move air across a thermal transfer element exterior to the hard disk drive.

The thermal controller may further provide a fan driving signal to the second electrical contact pair.

The thermal controller may preferably provide the fan driving signal with at least one fan potential difference distinct from zero volts, when the temperature measure is either above the top operating temperature or below the bottom operating temperature.

The fan driving signal may be at least temporarily a Direct Current (DC) signal and/or an Alternating Current (AC) signal.

The invention includes the hard disk drive, including the thermal controller directing the thermoelectric device.

Preferably, the thermal controller provides the driving signal to the electrical contact pair to direct a thermoelectric device in the first heat transfer and in the second heat transfer.

The invention includes a system comprising at least one of the hard disk drives controlling the temperature of an internal thermal zone in the hard disk drive.

These systems include, but are not limited to, a Redundant Arrays of Inexpensive Disks (RAID), a server computer, a desktop computer, and a notebook computer.

The invention includes manufacturing the hard disk drive and the hard disk drive as a product of the manufacturing process. The invention includes manufacturing the system using the hard disk drives and the system as a product of the manufacturing process.

BRIEF DESCRIPTION OF THE DRAWINGS

FIGS. 9A, 11A and 11E show details of the external cover and/or the thermoelectric device of the previous Figures including a thermal controller;

FIGS. 9B to 10A show various aspects of the thermal controller;

FIGS. 10B, 10C, 11B, 11C, 11D, and 12A to 12F show flowcharts discussing some of the operational aspects of the external cover;

FIGS. 13A to 13I show various aspects of systems using the hard disk drives of the invention.

FIGS. 15A to 17A show further aspects of the thermal controller; and

DETAILED DESCRIPTION

This invention relates to hard disk drive components, in particular, to mechanisms to regulate and control the internal ambient temperature inside a hard disk drive.

Figure 1:
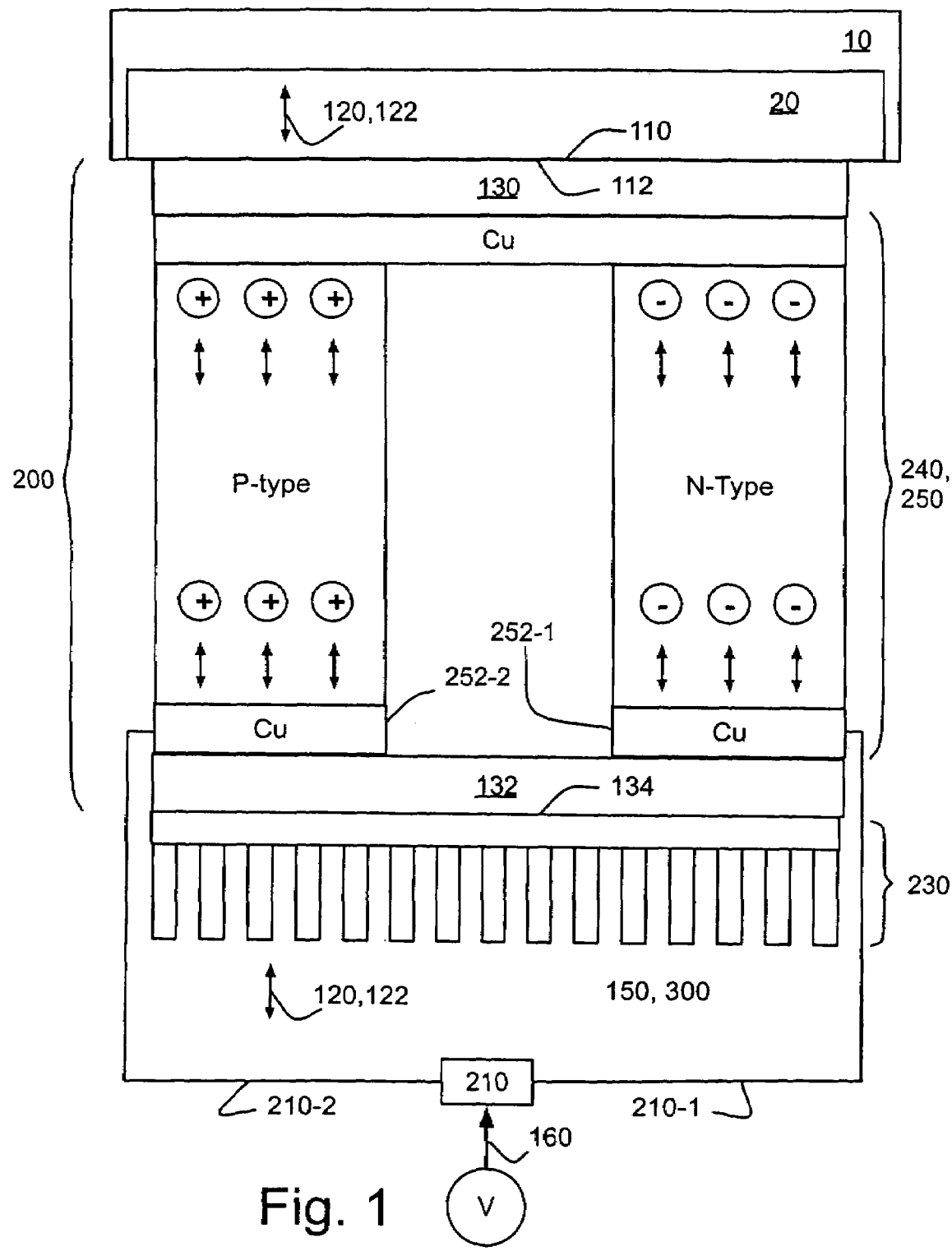
FIGS. 1 to 3 shows controlling the internal thermal zone of a hard disk drive by moving heat into or out of its internal thermal zone.
Figure 2:
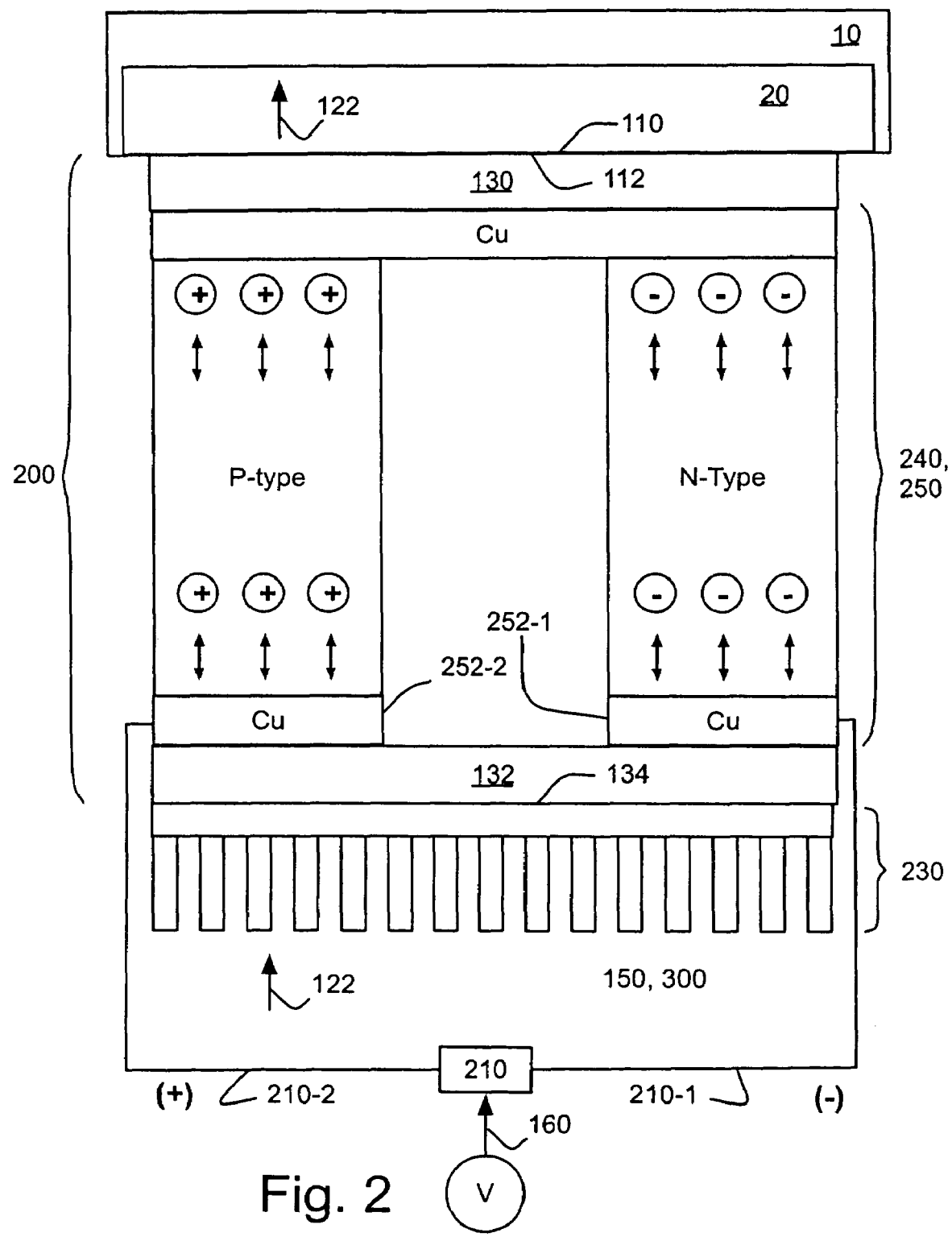
Figure 3:
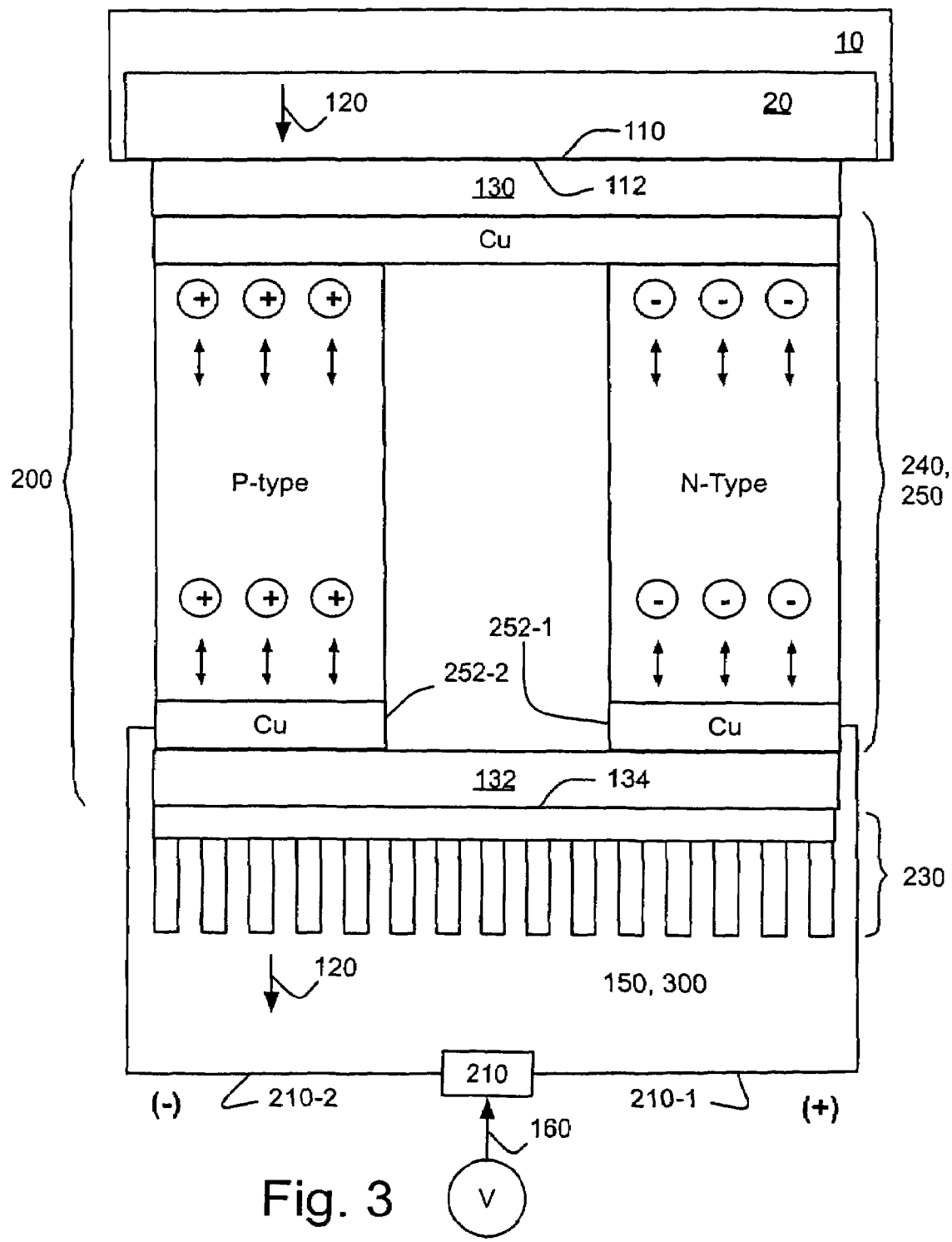

The invention includes controlling a thermoelectric device 200 to affect the temperature of an internal thermal zone 20 in a hard disk drive 10, as shown in FIGS. 1 to 3. This includes Applying a first potential difference V1 between an electrical contact pair 210 to enable a first heat transfer 120 from an internal heat transfer interface 130 included in a intermediate thermal intermediate thermal transfer interface 110 to an exterior heat transfer interface 132 thermally coupling to the exterior 300 of the hard disk drive, as shown in FIG. 3.

The thermal interface is thermally coupled to the internal thermal zone of the hard disk drive.

And applying a second potential difference V2 between the electrical contact pair to enable a second heat transfer 122 from the exterior heat transfer interface to the internal heat transfer interface, as shown in FIG. 2.

The sign of the first potential difference is the opposite of the sign of the second potential difference.

The first heat transfer and the second heat transfer are the products of this process.

A thermal controller 500 may implement the control method, as shown in FIG. 7A to 12F.

Controlling the thermoelectric device 200 may be based upon a temperature measure 510, as shown in FIGS. 9A to 10C and 12C to 12F.

Applying the first potential difference V1 may include applying the first potential difference between the electrical contact pair 210, when the temperature measure is above a top operating temperature 512.

Applying the second potential difference V2 may include applying the second potential difference when the temperature measure is below the bottom operating temperature 514.

The invention includes the external cover 100 for the hard disk drive 10 including the thermal controller 500 as shown in FIGS. 9A and 11E. A disk cover 16 and/or a disk base 14 may serve as the external cover for the hard disk drive as shown in FIGS. 5 to 7C.

The thermoelectric device 200 may preferably provide two heat transfers across the intermediate thermal transfer interface 110 to the exterior 300 of the hard disk drive 10, into the internal thermal zone 20 to warm it, and out of the internal thermal zone to cool it, as shown in FIG. 1. The thermoelectric device 200 may preferably provide a first heat transfer 120 across the transfer interface from the internal thermal zone to the exterior of the hard disk drive to cool it as shown in FIG. 3. The thermoelectric device also provides a second heat transfer 122 from the exterior to the internal thermal zone to warm the internal thermal zone as shown in FIG. 2. The thermoelectric device preferably includes the means for enabling power 240 from the electrical contact pair for the first thermal transfer and for the second thermal transfer. The means for enabling power may preferably include at least one semiconductor device 250.

Figure 4:
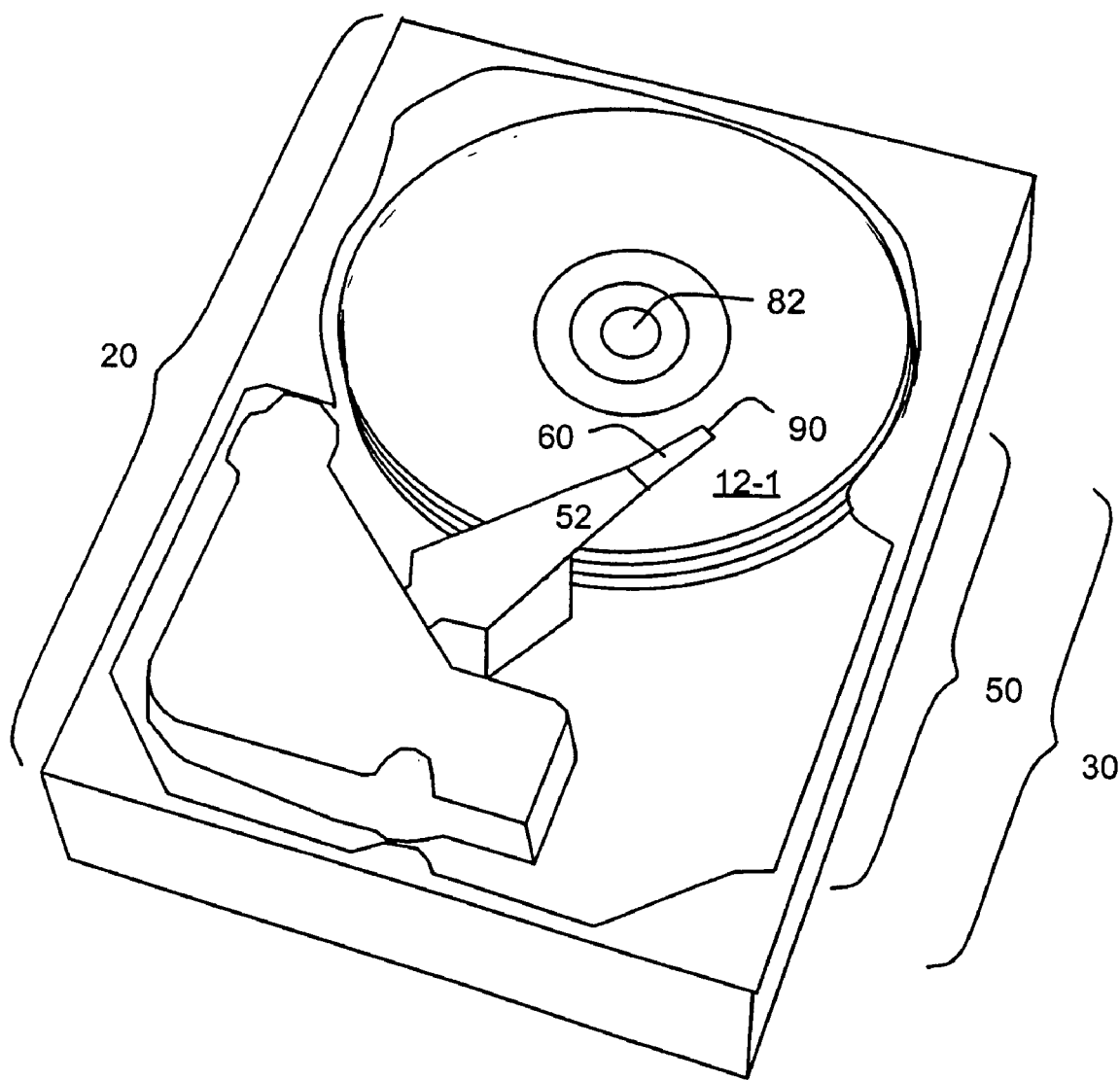
FIG. 4 shows some of the various aspects of the internal thermal zone of FIGS. 1 to 3.
Figure 5:
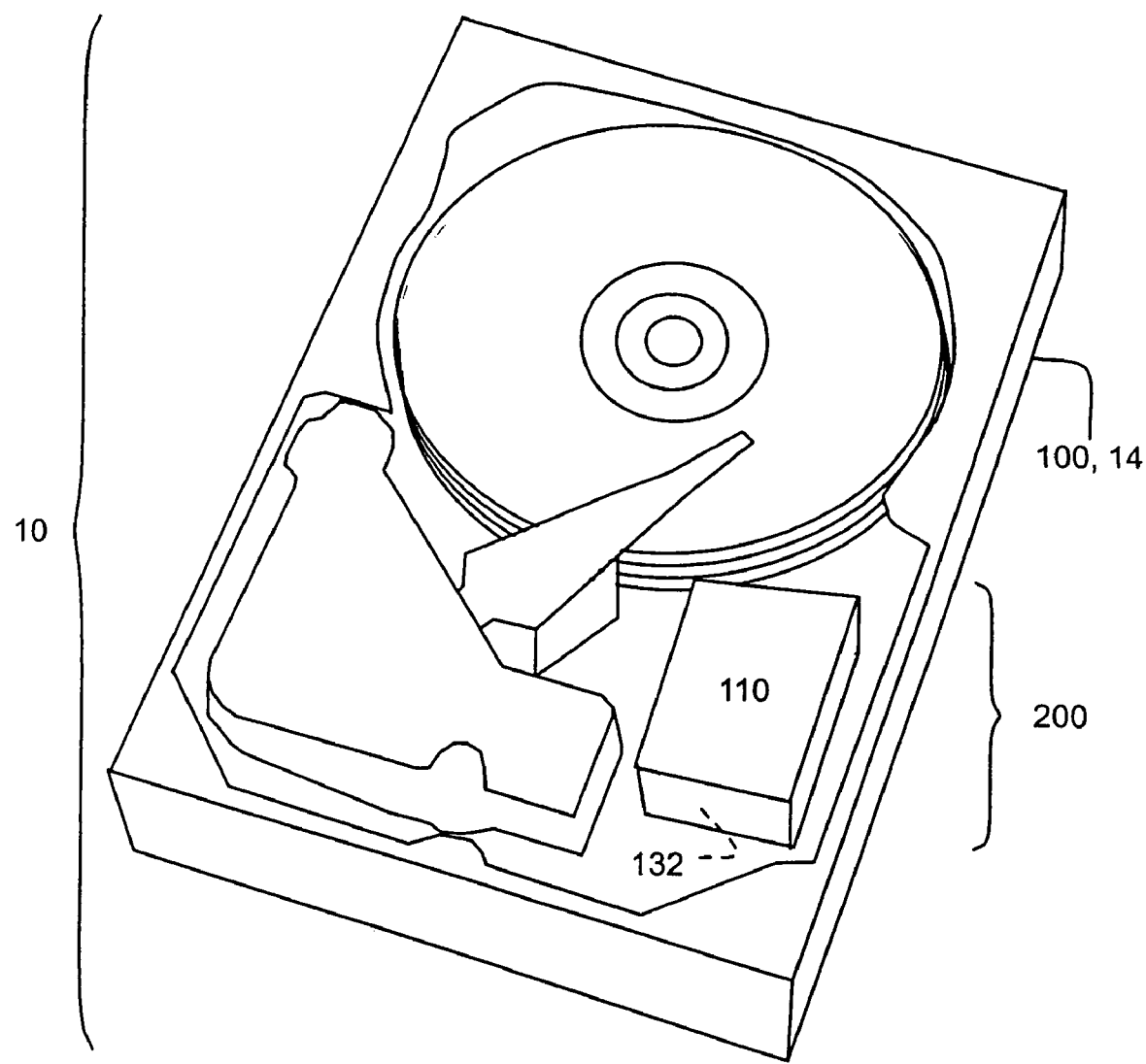
FIGS. 5 to 8C show various aspects of the external cover with the transfer interface of FIGS. 1 to 3 with regards to the hard disk drive.

The internal thermal zone 20 may preferably include at least one disk surface 12-1, and may preferably further include each disk 12, each disk surface 12-1 and each slider 90 moving near the disk surfaces as shown in FIG. 4. The internal thermal zone may further include the head gimbal assembly 60 including the slider. The internal thermal zone may further include the actuator arm 52 including the head gimbal assembly, likewise the actuator assembly 50 and the voice coil motor 30. The internal thermal zone may also include the spindle 82 and/or the spindle motor 80 as shown in FIGS. 7A, 7B, 8A, and 8B.

The intermediate thermal transfer interface 110 may provide a nearly planar surface to the thermoelectric device 200, as shown in FIGS. 1 to 3, and 5 to 7B. The planar surface may have a surface area of at least one square inch, and may further be at most four square inches.

The external cover 100 may further include the thermoelectric device 200 providing an exterior heat transfer interface 132 thermal-coupling to the exterior 300 of the hard disk drive 10 through a second thermal-couple 134. The thermoelectric device may include an internal heat transfer interface 130 thermal-coupling to the intermediate thermal transfer interface 110 through a thermal-couple 112. The second thermal-coupling may further preferably be to air 150 exterior 300 to the hard disk drive 10.

The thermoelectric device 200 may preferably include an electrical contact pair 210 providing enabling power for a first heat transfer 120 from the intermediate thermal transfer interface 110 including the internal heat transfer interface 130 to the exterior heat transfer interface 132, and a second heat transfer 132 from the exterior heat transfer interface to the transfer interface. Preferably, applying a first potential difference V1 between the electrical contact pair 210 enables the first heat transfer as shown in FIG. 2, and applying a second potential difference V2 between the electrical contact pair enables the second heat transfer as in FIG. 3. Preferably, the sign of the first potential difference is opposite the sign of the second potential difference.

The thermoelectric device 200 includes at least one semiconductor device 250 acting as a heat pump and using the intermediate thermal transfer interface 110 to thermally-affect the internal thermal zone 20, as shown in FIGS. 1 to 3.

The thermoelectric device may use the transfer interface to move heat out of the internal thermal zone, which will tend to thermally-affect the internal thermal zone by lowering its temperature, as shown in FIG. 2. Also, the thermoelectric device may use the transfer interface to move heat into the internal thermal zone, tending to thermally-affect the internal thermal zone by raising its temperature, as shown in FIG. 3.

The semiconductor device 250 preferably includes a first semiconductor terminal 252-1 electrically coupled to a first electrical contact 210-1, and a second semiconductor terminal 252-2 electrically coupled to a second electrical contact 210-2. The electrical contact pair 210 preferably consists essentially of the first electrical contact and the second electrical contact. The electrical contact pair may also be considered to include electrical insulation and conductive paths, which do not change the essential electrical circuitry of the first electrical contact and the second electrical contact.

Figure 14A:
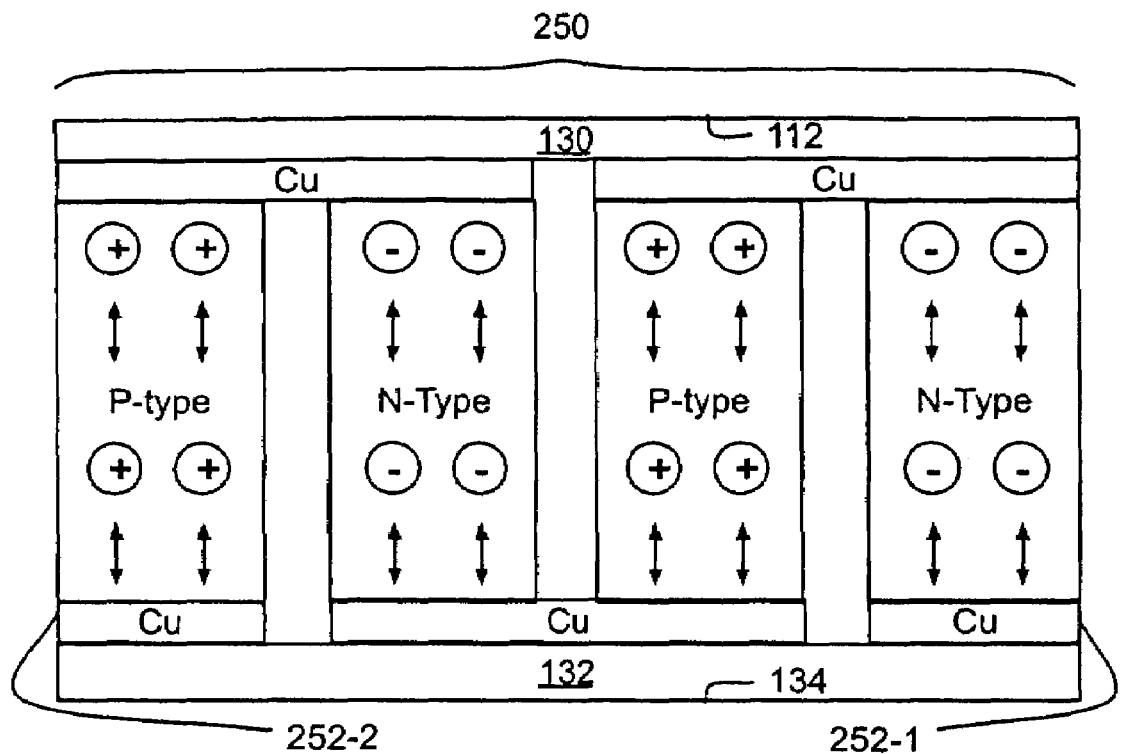
FIGS. 14A and 14B show some alternative embodiments of the semiconductor device of the previous Figures.
Figure 14B:
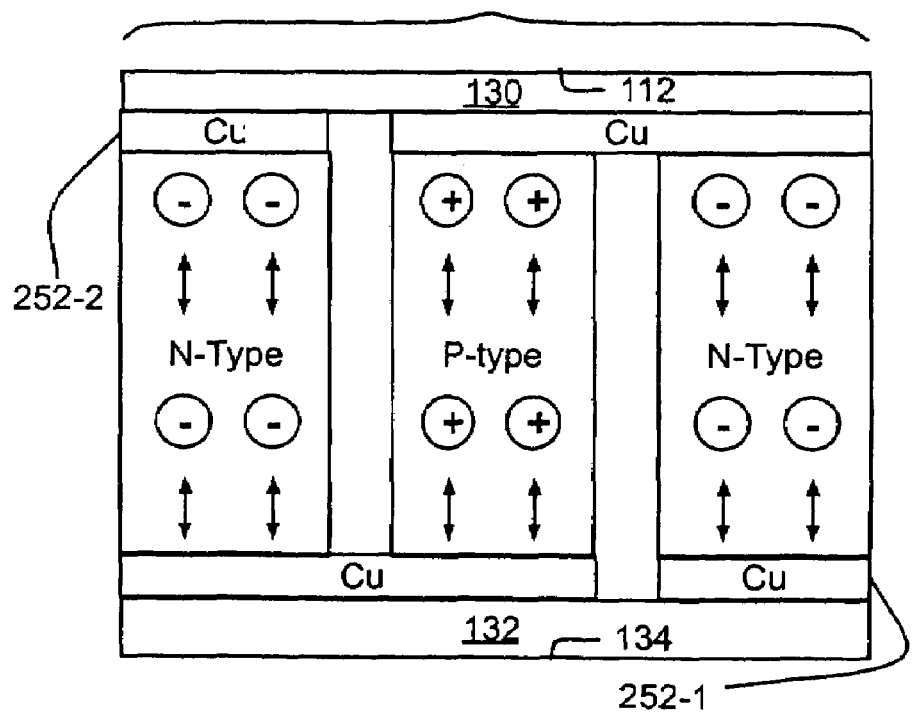

A thermoelectric device 200 refers herein to a solid-state heat pump that may preferably operate on the Peltier effect. The semiconductor device 250 preferably contains an array of p- and n-type semiconductor elements heavily doped with electrical carriers. This array is often electrically connected in series and thermally connected in parallel and then affixed to two ceramic substrates, the internal heat transfer interface 130 and the exterior heat transfer interface 132, one on each side of the elements, as in FIGS. 1 to 3 and 14A and 14B. In FIGS. 1 to 3 and 14A, the semiconductor device is shown with the number of N-type semiconductor elements is the same as the number of P-type semiconductor elements. In FIG. 14B, the number of N-type semiconductor elements is distinct from the number of P-type semiconductor elements. While FIG. 14B shows more N-type semiconductor elements than P-type semiconductor elements, the invention also includes semiconductor devices with more P-type semiconductor elements than N-type semiconductor elements.

Consider how the heat transfer occurs as electrons flow through one pair of n- and p-type elements, which is referred to herein as a couple within the thermoelectric device. Electrons can travel freely in the conductors, which are often made of copper, but not so freely in the semiconductor. These conductors are labeled Cu in FIGS. 1 to 3. This discussion will now focus on FIG. 3, however, the discussion of FIG. 2 basically reverses the sign of the voltage of the driving signal 160, reversing the flowing of holes and electrons, as well as the direction of heat transfer, As the electrons leave the conductor Cu, they enter the hot side of the P-Type and must fill a hole in order to move through the P-Type. When an electron fills a hole, it drops to a lower energy level, releasing heat. The holes in the P-Type move from the cold side to the hot side. As an electron moves from the P-Type into the conductor Cu on the cold side, the electron moves to a higher energy level through absorbing heat. The electron moves freely through the conductor CU until reaching the cold side of the N-Type semiconductor. When the electron moves into the N-Type, it bumps up an energy level in order to move through the semiconductor, absorbing heat. As the electron leaves the hot-side of the N-Type, it moves freely in the conductor Cu. It drops to a lower energy level releasing heat.

Heat is always absorbed at the cold side of the n- and p-type elements. The electrical charge carriers (holes in the P-Type; electrons in the N-Type) always travel from the cold side to the hot side, and heat is always released at the hot side of a thermoelectric element. The heat pumping capacity of a thermoelectric device is proportional to the current and dependent on the element geometry, number of couples, and material properties.

As used herein, the Peltier effect is the phenomenon whereby the passage of an electrical current through a junction consisting of two dissimilar metals results in a cooling effect. When the direction of current flow is reversed heating will occur.

A thermal transfer element 230 refers herein a device that is typically thermally coupled to a heat transfer interface of a thermoelectric device 200, usually the exterior heat transfer interface 132, for heat transfers with the exterior 300 of the hard disk drive 10. It is used to facilitate the transfer of heat between the thermoelectric device and the exterior of the hard disk drive. The most common thermal transfer element is an aluminum plate that has fins attached to it, as shown in FIGS. 1 to 3, 7C and 8C. A fan 222 is used to move ambient air 150 through the thermal transfer element to transfer heat. Another style of thermal transfer element uses a plate with tubing embedded in it. A liquid is sent through the tubing to pick up heat from the thermoelectric device.

Figure 10A:
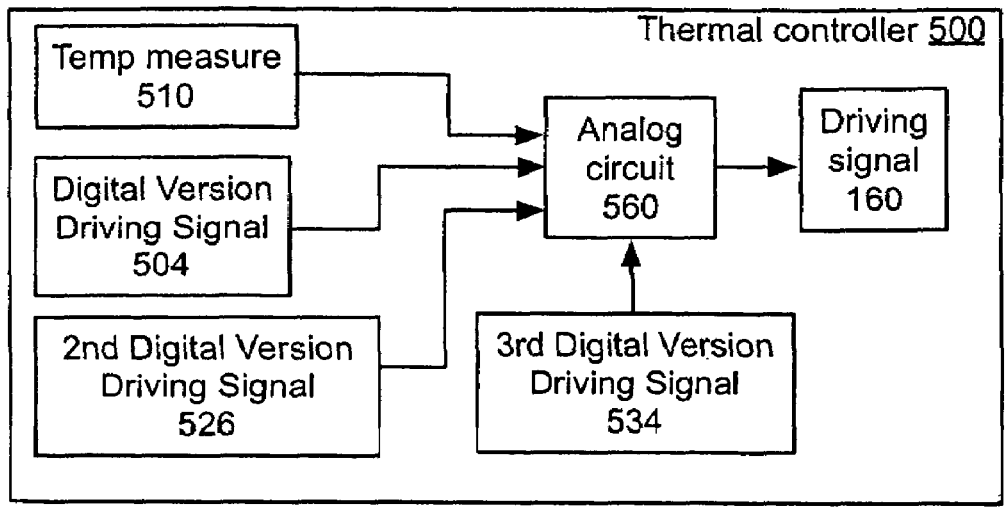

The external cover 100 may further include a thermal controller 500 receiving a temperature measure 510 of the internal thermal zone 20 and providing a driving signal 160 to the electrical contact pair 210, as shown in FIG. 9A. Alternatively, the thermoelectric device 200 may preferably include the thermal controller, as shown in FIG. 11A. The thermal controller may include a means for applying the first potential difference 550 between the contact pair to enable the first heat transfer 120, and the means for applying the second potential difference 552 between the contact pair to enable the second heat transfer 122, as shown in FIG. 10D. Preferably, the thermal controller forces the driving signal 160 toward the first potential difference V1 when the temperature measure 510 is greater than a top operating temperature 512. Preferably, the thermal controller forces the driving signal toward the second potential difference V2, when the temperature measure is less than a lower operating temperature 514.

The thermal controller 500 may include at least one of the following. A finite state machine 502 generating a digital version 504 of the driving signal based upon the temperature measure 510 as in FIG. 9B. A computer 520 accessibly coupled 522 to a memory 524 containing a program system 600 including at least one program step generating a second digital version 526 of the driving signal based upon the temperature measure as in FIG. 9C. A neural network 530 responding 532 to the temperature measure to generate a third digital version 534 of the driving signal, as in FIG. 9D. The thermal controller may further include exactly one of the finite state machine, the computer and the neural network, or a combination of these elements, such as a finite state machine and a computer, two finite state machines, and so on.

As used herein, the computer 520 will include at least one instruction processor and at least one data processor. Each data processor will be directed by at least one instruction processor. The computer may be implemented in, or as, a Field Programmable Gate Array, gate array, an application specific integrated circuit, a digital signal processor, and/or a general-purpose microprocessor.

The memory 524 may include memory components that are non-volatile memories and/or volatile memories. Non-volatile memories tend to retain their memory contents without the application of external power, whereas volatile memories tend to lose their memory contents without the application of external power. The memory may and often does contain both non-volatile memory components and volatile memory components.

The finite state machine 502 may be implemented by any combination of: a logic circuit, a programmable logic device, and/or a Field Programmable Gate Array. The logic circuit may be implemented in a gate array and/or an application specific integrated circuit.

The neural network 530 may be implemented similarly to the finite state machine 502, and include neurons, each with a neural state and coupling through weighted paths to other neurons. Upon the stimulus of the temperature measure 510, the neural network responds by calculating the path couplings, possibly changing the state of at least some of the neurons, and taking the weighted path response to generate the third digital version 534 of the driving signal.

The following figures include flowcharts of at least one method of the invention possessing arrows with reference numbers. These arrows will signify of flow of control and sometimes data, supporting implementations including at least one program step or program thread executing upon a computer, inferential links in an inferential engine, state transitions in a finite state machine, and learned responses within a neural network.

The step of starting a flowchart refers to at least one of the following and is denoted by an oval with the text "Start" in it. Entering a subroutine in a macro instruction sequence in a computer. Entering into a deeper node of an inferential graph. Directing a state transition in a finite state machine, possibly while pushing a return state. And triggering at least one neuron in a neural network.

The step of termination in a flowchart refers to at least one of the following and is denoted by an oval with the text "Exit" in it. The completion of those steps, which may result in a subroutine return, traversal of a higher node in an inferential graph, popping of a previously stored state in a finite state machine, return to dormancy of the firing neurons of the neural network.

A step in a flowchart refers to at least one of the following. The instruction processor responds to the step as a program step to control the data execution unit in at least partly implementing the step. The inferential engine responds to the step as nodes and transitions within an inferential graph based upon and modifying a inference database in at least partly implementing the step. The neural network responds to the step as stimulus in at least partly implementing the step. The finite state machine responds to the step as at least one member of a finite state collection comprising a state and a state transition, implementing at least part of the step.

Several flowcharts include multiple steps. In certain aspects, any one of the steps may be found in an embodiment of the invention. In other aspects, multiple steps are needed in an embodiment of the invention. When multiple steps are needed, these steps may be performed concurrently, sequentially and/or in a combination of concurrent and sequential operations. The shapes of the arrows in multiple step flowcharts may differ from one flowchart to another, and are not to be construed as having intrinsic meaning in interpreting the concurrency of the steps.

Figure 10B:
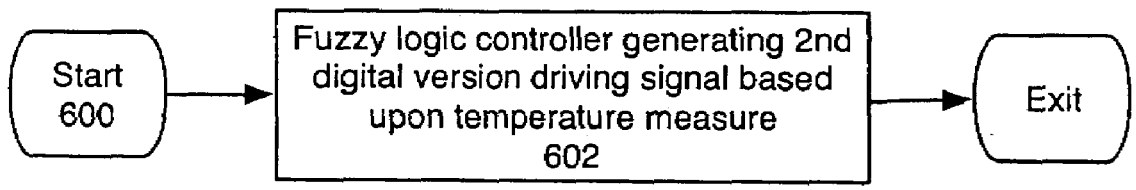

The program system 600 of FIG. 9C may implement a fuzzy logic controller generating the second digital version 526 of the driving signal based upon the temperature measure 510, as shown in operation 602 of FIG. 10B. Typically, a fuzzy logic controller includes a list of at least two fuzzy inferences.

Figure 10C:
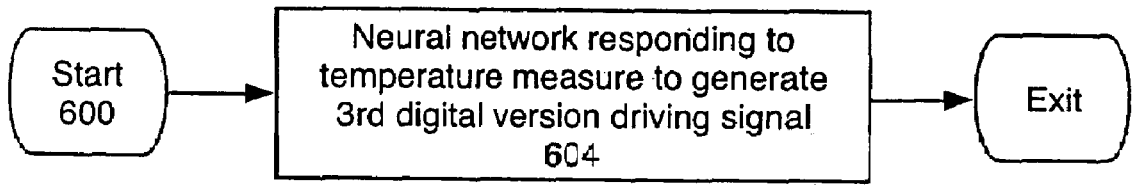
Figure 10D:
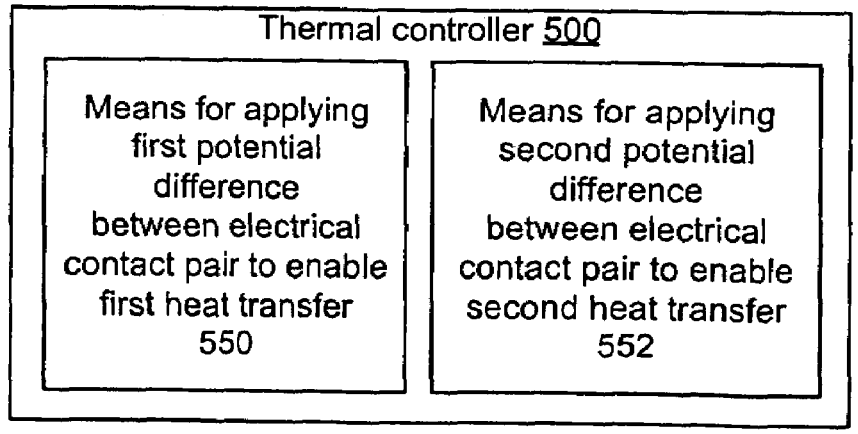

The program system 600 may include a program step implementing the neural network 530 responding 532 to the temperature measure 510 to generate the third digital version 534 of the driving signal, as shown by operation 604 of FIG. 10C.

The thermal controller 500 may include an analog circuit 560 generating the driving signal 160 based upon at least one of the temperature measure 510, the digital version 504 of the driving signal, the second digital version 526 of the driving signal, and the third digital version 534 of the driving signal as shown in FIG. 10A. The analog circuit may further generate the driving signal based upon exactly one of these.

The thermal controller 500 may further include the following:

A first means for forcing 554 the driving signal 160 toward the first potential difference V1 between the electrical contact pair 210 to enable the first heat transfer 120 when the temperature measure 510 is above a top operating temperature 512.

And a second means for forcing 556 the driving signal toward the second potential difference between the electrical contact pair, when the temperature measure is below a lower operating temperature 514.

Figure 15A:
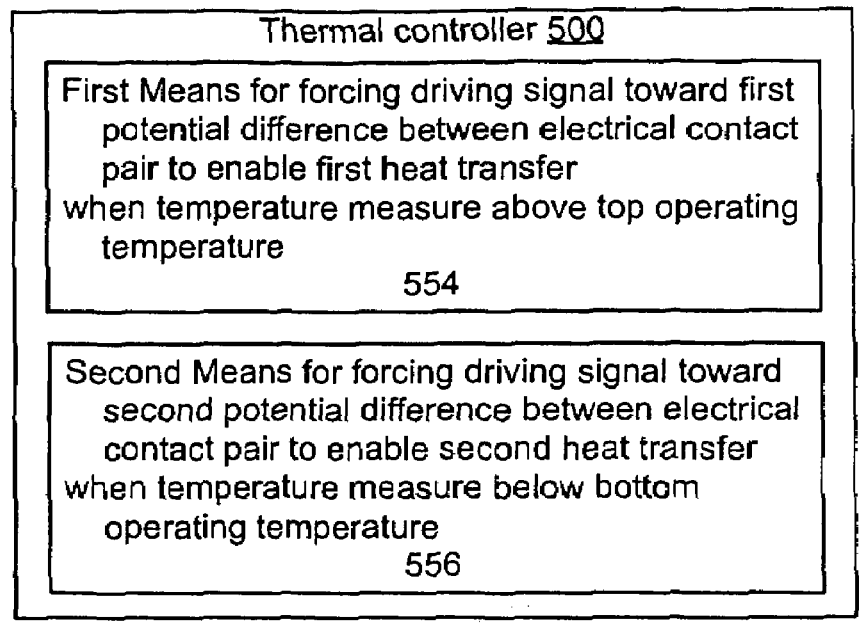

FIG. 15A shows the first means and the second means included in the thermal controller.

Figure 15B:
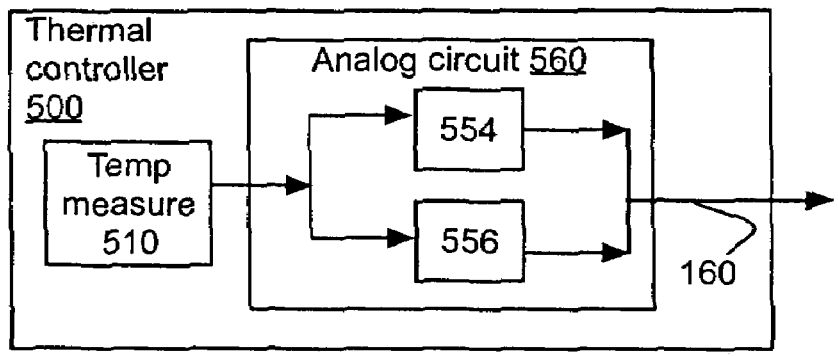
Figure 17A:
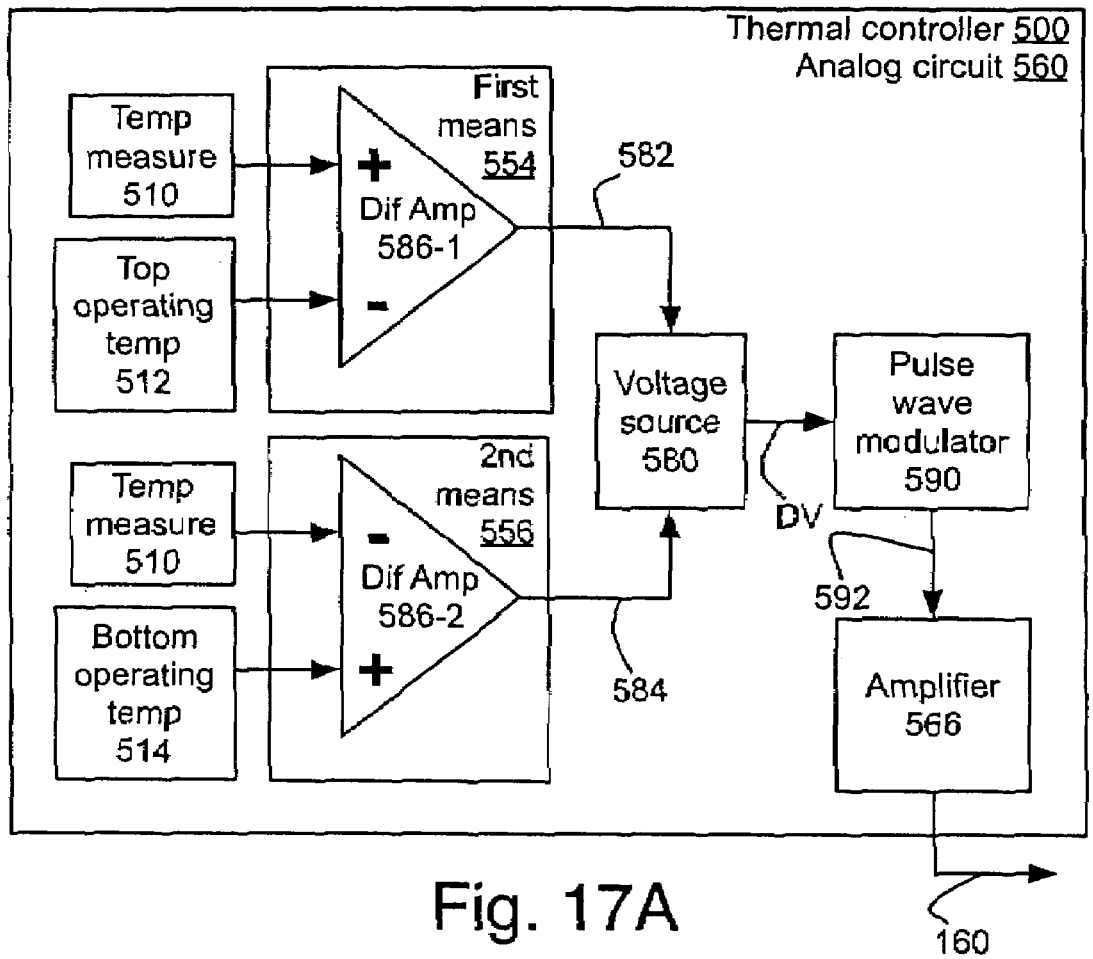

FIGS. 15B and 17A show the first means and the second means included in the analog circuit 560. This represents a predominantly analog circuit approach.

Figure 15C:
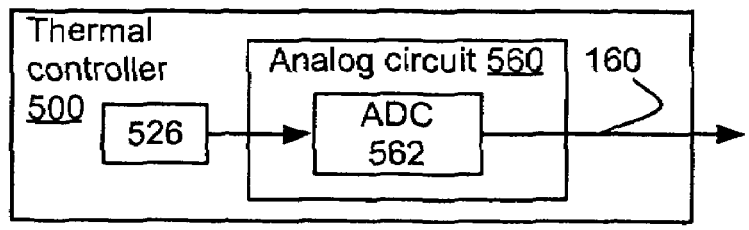
Figure 15D:
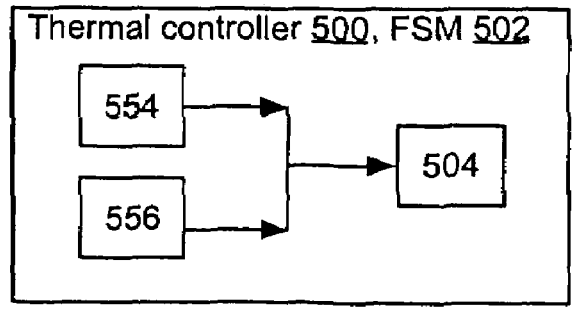

Alternatively, FIG. 15C shows the first means and the second means included in the Finite State Machine 502, collectively generating the digital version of the driving signal 504, within the thermal controller. This is a predominantly digital logic approach.

FIG. 15C shows the second digital version 526 of the driving signal being presented to an Analog to Digital Converter 562 to at least partly create the driving signal 160. The second digital version of the driving signal is preferably generated by the computer 520 shown in FIG. 9C. This is a predominantly computer based approach.

Figure 16A:
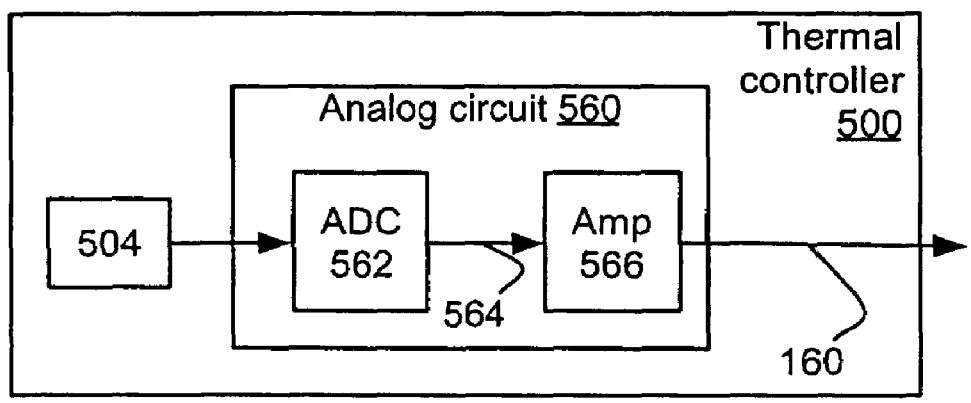

FIG. 16A shows an alternative and a refinement to FIG. 15C, where the digital version of the driving signal is presented to the Analog to Digital Converter to create a first analog signal version 564 of the driving signal, which is presented to the first amplifier 566 to at least partly create the driving signal.

Figure 16B:
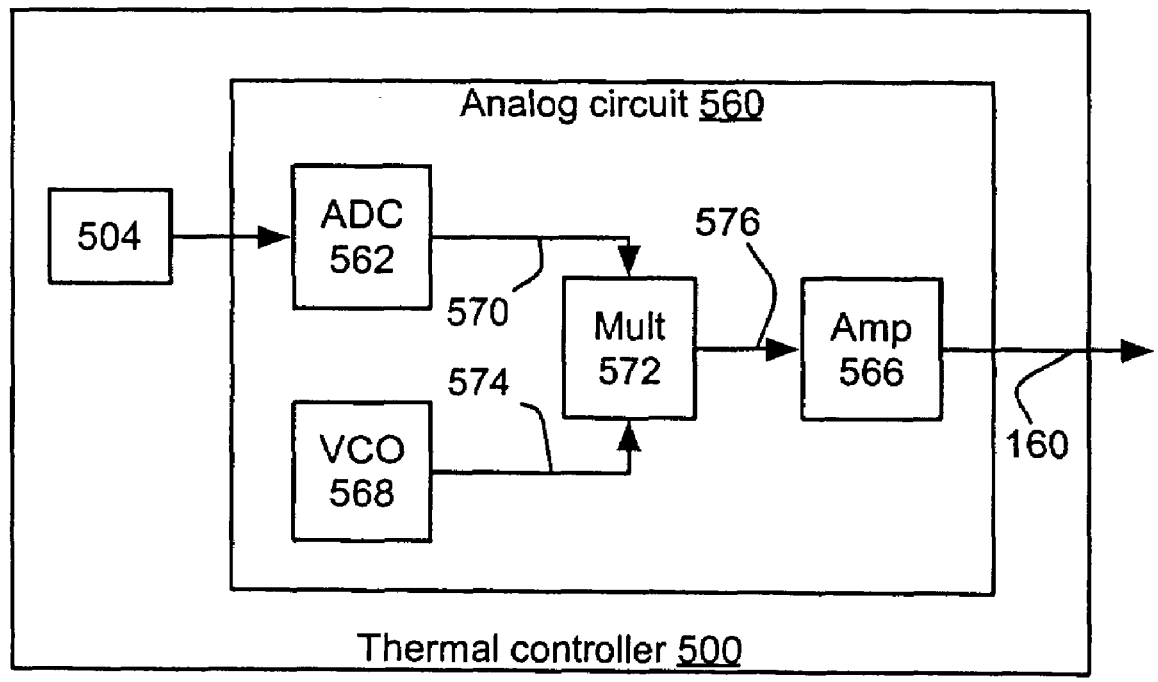

FIG. 16B shows a further refinement of FIG. 16A. The analog to digital converter provides a second analog signal version 570 to an analog multiplier 572. A Voltage Controlled Oscillator 568 also provides an oscillating carrier signal 574 to the analog multiplier. The analog multiplier provides a third analog signal version 576 to the first amplifier to at least partly create the driving signal.

Looking in greater detail at FIG. 17A, the temperature measure 510 is provided to the first means 554 and to the second means 556 as in FIG. 15B.

The first means includes a first differential amplifier 586-1, to which the temperature measure is provided to the "+" terminal, and the top operating temperature 512 is provided to the "−" terminal to create the too hot signal 582.

The second means includes a second differential amplifier 586-2, to which the temperature measure is provided to the "−" terminal, and the bottom operating temperature 514 is provided to the "+" terminal to create the too cold signal 584.

The voltage source 580 receives the too hot signal and the too cold signal and uses them to create the driving voltage DV provided to the pulse wave modulator 590.

When the temperature measure is above the top operating temperature, the too hot signal is active.

When the too hot signal is active, the too cold signal is preferably inactive.

The voltage source preferably provides the driving voltage sufficient that the resulting driving signal forces the contact pair 210 toward the first potential difference V1.

When the temperature measure is below the bottom operating temperature, the too cold signal is active.

When the too cold signal is active, the too hot signal is preferably inactive.

The voltage source preferably provides the driving voltage sufficient that the resulting driving signal forces the contact pair toward the second potential difference V2.

When the temperature measure is within normal operating temperatures

The temperature means is not below the bottom operating temperature, and the too cold signal is preferably inactive.

The temperature means is not above the top operating temperature, and the too hot signal is preferably inactive.

Both the too cold signal and the too hot signal are preferably inactive.

The voltage source preferably provides the driving voltage sufficient that the resulting driving signal forces the contact pair toward a low or zero potential difference.

The external cover 100 and alternatively, the thermoelectric device 200, may further include a second electrical contact pair 212 driving a fan motor 220 powering a fan 222, as shown in FIG. 11E.

When powered, the fan moves air 150 across a thermal transfer element 230 exterior 300 to the hard disk drive 10, as in FIG. 7A to 8C.

The thermal controller 500 may further provide a fan driving signal 224 to the second electrical contact pair.

The thermal controller may preferably provide the fan driving signal with at least one fan potential difference distinct from zero volts, when the temperature measure is either greater than the top operating temperature 512 or less than the bottom operating temperature 514.

The fan driving signal may be at least temporarily a Direct Current (DC) signal and/or an Alternating Current (AC) signal.

Manufacturing the thermoelectric device 200 may include providing the means for enabling power 240 with a thermal coupling to the internal heat transfer interface 130 and with a thermal coupling to the exterior heat transfer interface 132, and coupling the electrical contact pair 210 to the means for enabling power 240.

The thermoelectric device is a product of this manufacturing process.

Manufacturing the thermoelectric device may further include electrically coupling the thermal controller 500 to the electrical contact pair, and/or thermally coupling the thermal transfer element 230 to the exterior heat transfer interface.

Manufacturing the thermal controller 500 may include at least one of the following steps.

Providing the means for applying the first potential difference 550 and the means for applying the second potential difference 552 to at least partly create the thermal controller.

Providing a first means 554 for forcing the driving signal 160 toward the first potential difference V1 between the electrical contact pair 210, when a temperature measure 510 is above a top operating temperature 512 and a second means 556 for forcing the driving signal toward the second potential difference V2 between the electrical contact pair, when the temperature measure is below a lower operating temperature 514 to at least partly create the thermal controller.

Providing at least one finite state machine 502 generating a digital version 504 of the driving signal to at least partly create the thermal controller.

Providing at least one computer 520 generating a second digital version 526 of the driving signal to at least partly create the thermal controller.

Providing a neural network generating 530 a third digital version 534 of the driving signal to at least partly create the thermal controller.

Providing the program system 600 in the memory 524 to at least partly create the thermal controller.

And/or providing an analog circuit 560 to at least partly create the thermal controller.

Manufacture of the external cover 100 may include at least one of the following.

Die-stamping 700 a sheet of metal 702 to at least partly create the external cover including the intermediate thermal transfer interface 110.

Molding 710 molten metal 712 to at least partly create the external cover including the transfer interface.

The sheet of metal may preferably include a form of sheet stainless steel.

The molten metal may include a form of molten aluminum.

The invention includes the external cover as a product of this process.

The manufacture of the external cover 100 may further include thermal-coupling a thermoelectric device 200 via the intermediate thermal transfer interface 110 to its internal heat transfer interface 130.

Such external covers are shown in FIGS. 1 to 3, and may be preferred for use in a system employing shared fans and fan motors.

Further, a thermal transfer element 230 may be thermally-coupled to the exterior heat transfer interface 132.

A fan motor 220 and fan 222 may further be positioned near the thermal transfer element 230, as shown in FIGS. 7A to 8C.

Manufacture of the hard disk drive 10 may include at least one of the following:

Providing the thermal controller 500 and the thermoelectric device 200.

And electrically coupling the thermal controller via the electrical contact pair 210 to the thermoelectric device to create the hard disk drive.

The hard disk drive is a product of this manufacturing process.

These steps may be implemented by providing the thermoelectric device including the thermal controller.

Alternatively, the external cover 100 may include the thermoelectric device and possibly further include the thermal controller electrically coupled via the electrical contact pair, so that providing the external cover implements one or both of the above steps.

The manufacturing process for the hard disk drive 10 may further include at least one of the following.

Figure 6:
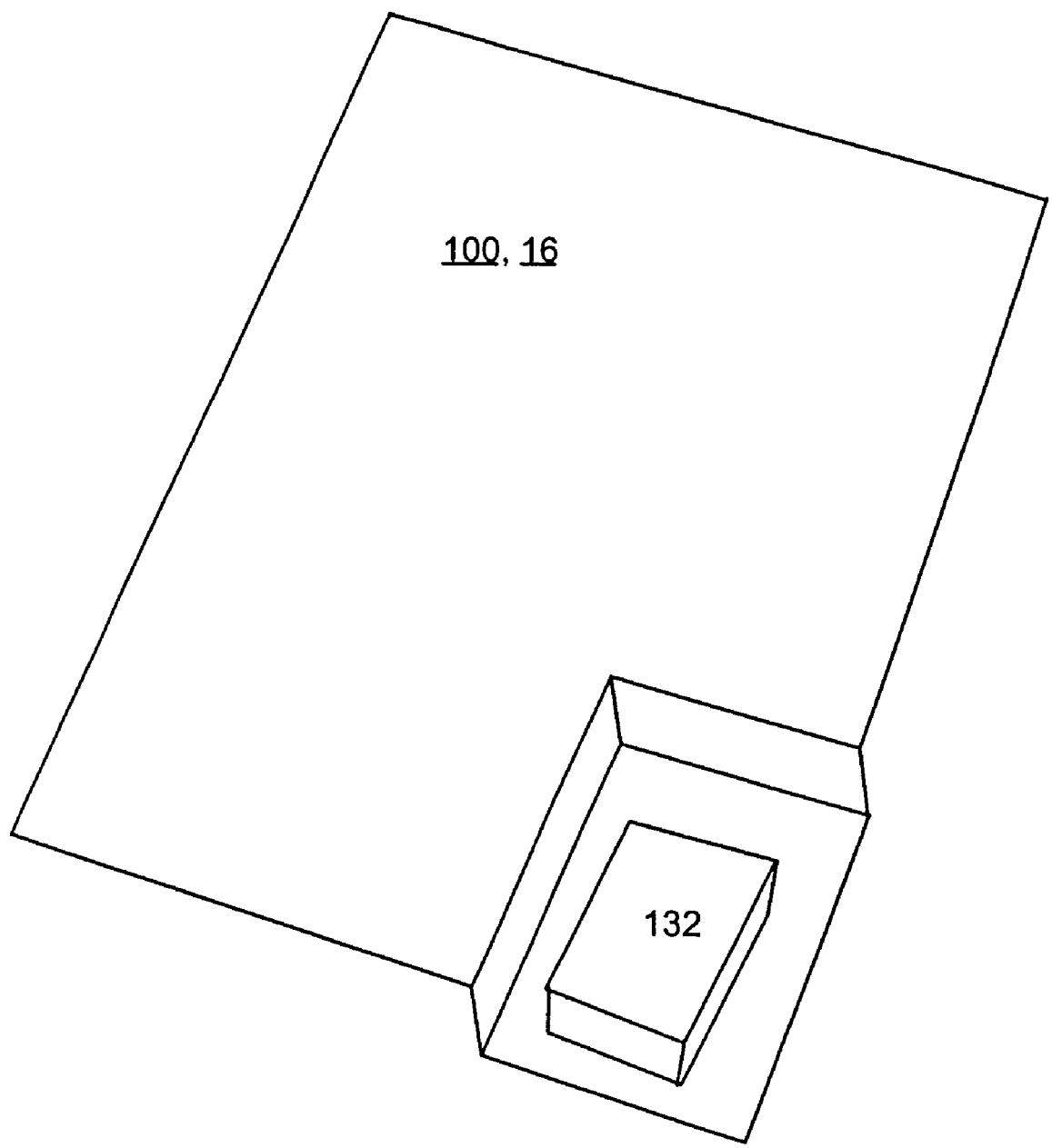
Figure 7A:
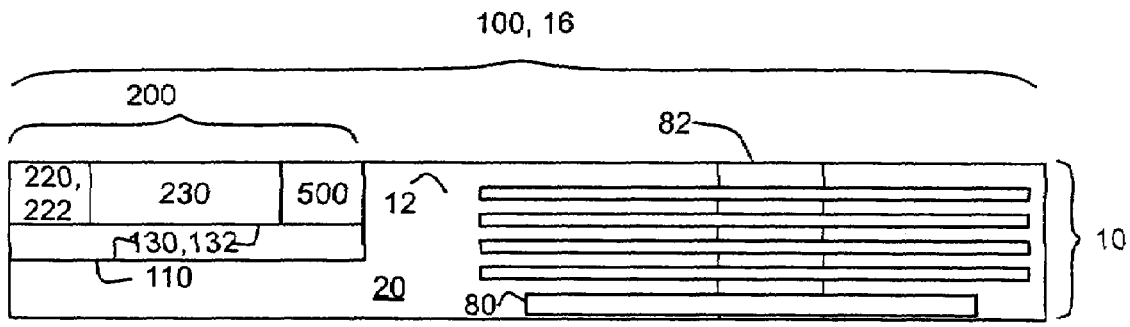
Figure 7B:
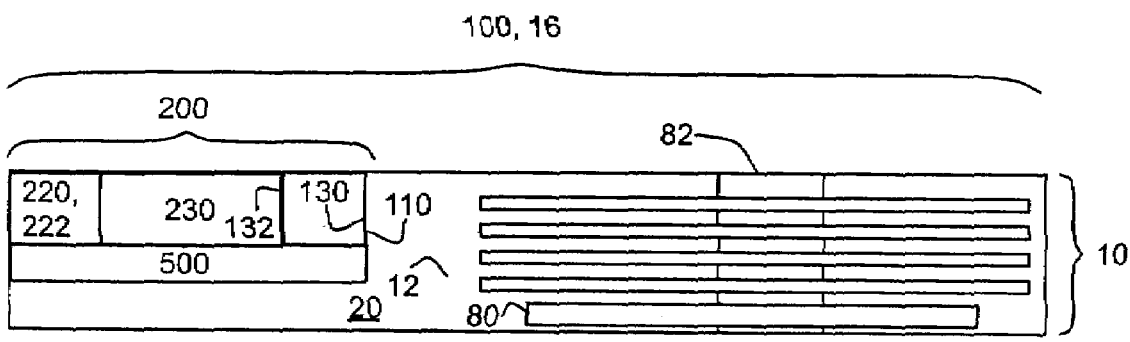
Figure 7C:
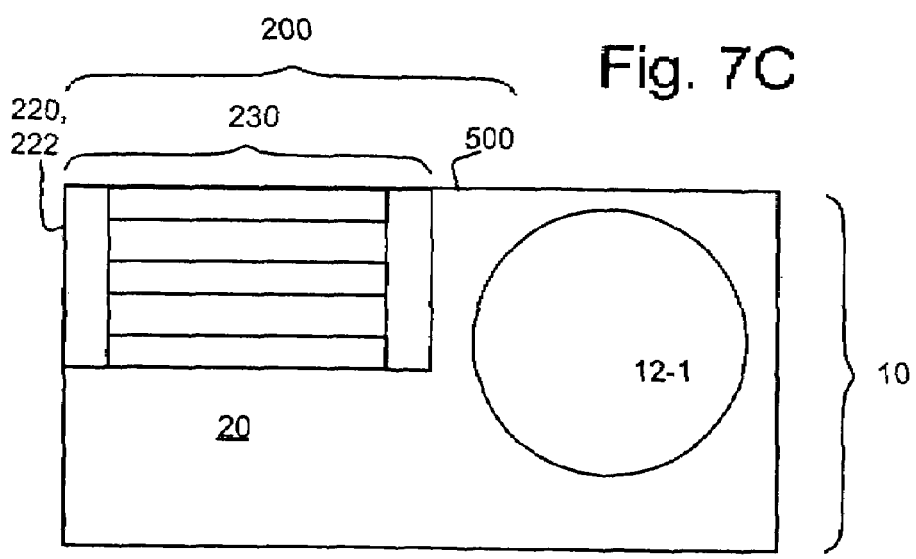
Figure 8A:
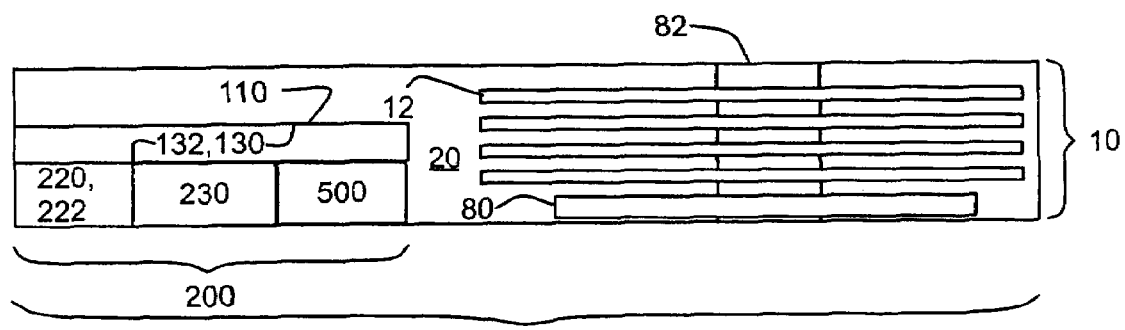
Figure 8B:
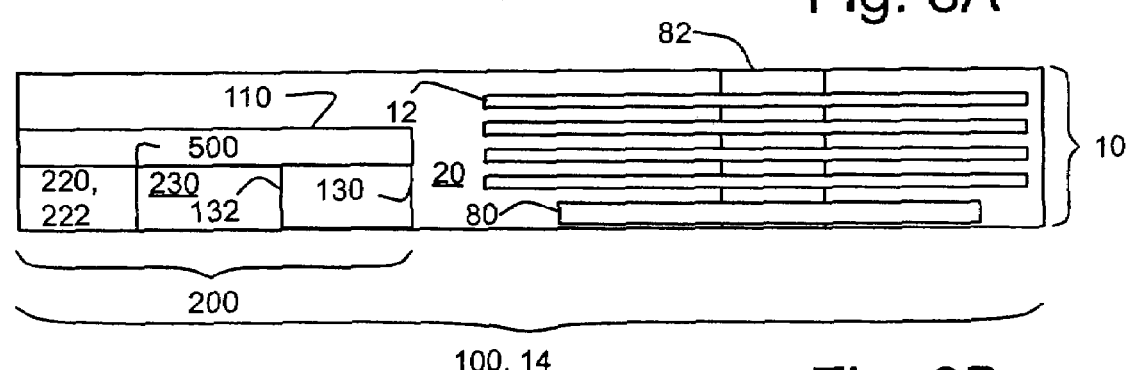
Figure 8C:
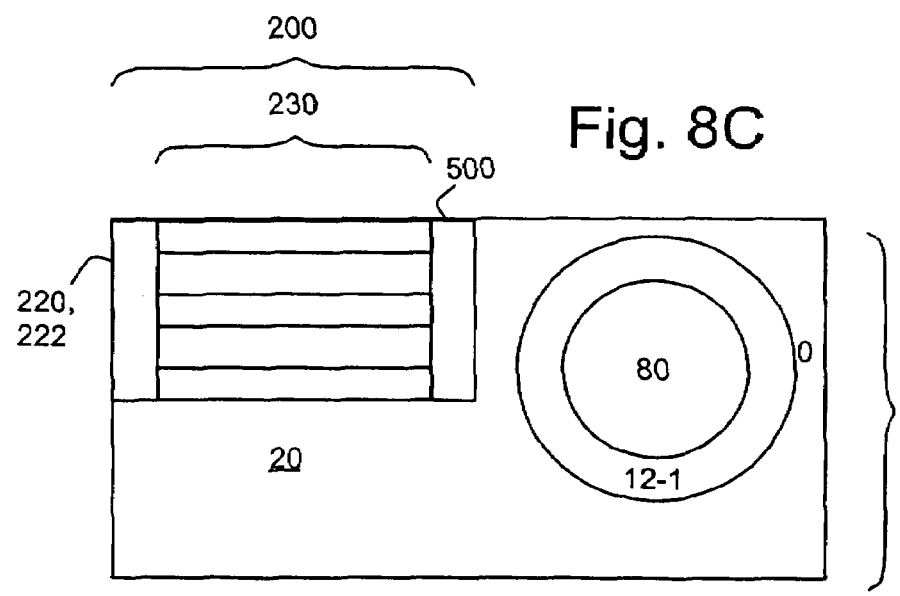

Using a disk cover 16 as the external cover 100 as shown in FIGS. 6 to 7C to create the hard disk drive.

Using a disk base 14 as the external cover, as shown in FIGS. 5 and 8A to 8C, to create the hard disk drive.

The manufacturing may include using both the disk cover and the disk base as external covers for the hard disk drive.

The external cover 100 and the hard disk drive 10 operate as follows.

While these operations may be implemented in a variety of fashions, to simplify their discussion, they will be discussed as implemented through operations performed by the program system 600.

The thermoelectric device 200 enables a first heat transfer 120 from the internal thermal zone 20 via the intermediate thermal transfer interface 110 to the exterior 300 of the hard disk drive 10 as shown in FIG. 2.

The thermoelectric devices also enables a second heat transfer 122 from the exterior of the hard disk drive via the transfer interface to the internal thermal zone, as shown in FIG. 3.

Operation 610 of FIG. 11B supports enabling the first heat transfer and operation 612 supports enabling the second heat transfer.

The thermoelectric device 200 may preferably include the thermal controller 500 electrically coupling with the electrical contact pair 210 to the means for enabling power 240 as shown in FIG. 11A. The means for enabling power may further preferably include the electrical contact pair coupling with the semiconductor device 250 through the first semiconductor terminal 252-1 and the second semiconductor terminal 252-2.

A driving signal 160 may preferably be provided to the electrical contact pair 210 to enable the first heat transfer 130 as in operation 620 of FIG. 11C, the second heat transfer 132 as in operation 620 of FIG. 11C, or essentially no-heat transfer as shown in operation 614 of FIG. 11B. Essentially no-heat transfer refers herein to the thermal transfer condition when no power is being expended through the electrical contact pair.

Figure 12A:
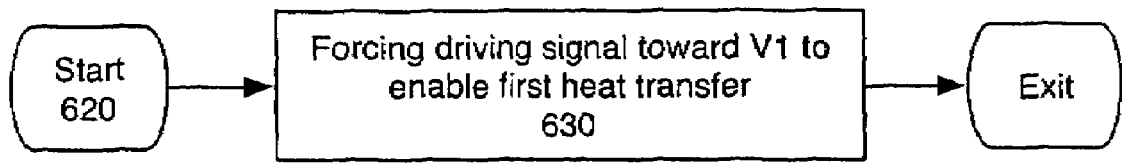
Figure 12B:
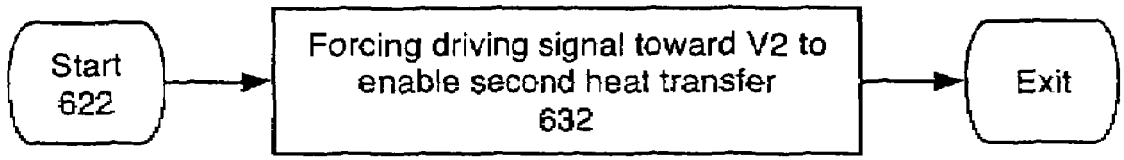
Figure 12C:
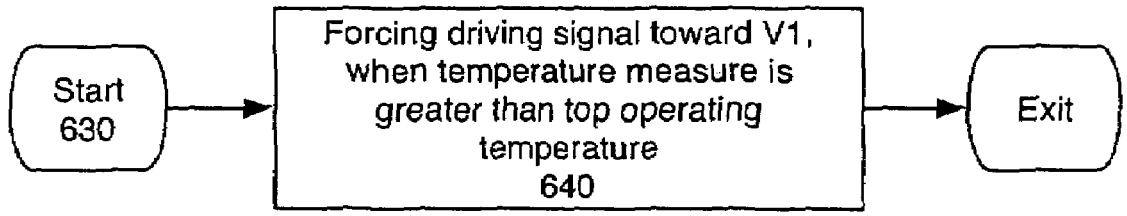
Figure 12D:
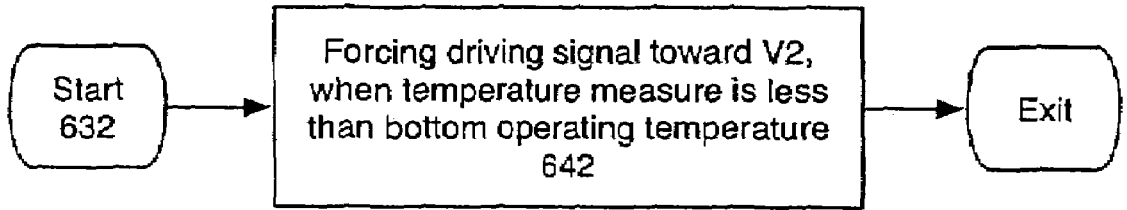

Providing the driving signal 160 may preferably include forcing the driving signal toward the first potential difference V1 to enable the first heat transfer 120 as in operation 630 of FIG. 12A, and forcing the driving signal toward the second potential difference V2 to enable the second heat transfer 122 as in operation 632 in operation 12B.

A temperature measure 510 may preferably be determined for the internal thermal zone 20. Forcing the driving signal 160 toward the first potential difference V1 may preferably occur when the temperature measure is greater than a top operating temperature 512 as in operation 640 of FIG. 12C. Forcing the driving signal toward the second potential difference V2 may preferably occur when the temperature measure is less than the bottom operating temperature 514 as in operation 642 of FIG. 12D. In certain embodiments, the test for when may include equality, so that forcing the driving signal toward the first potential difference may occur when the temperature measure is greater than or equal to the top operating temperature.

Pulse-width-modulation may be employed.

Figure 12E:
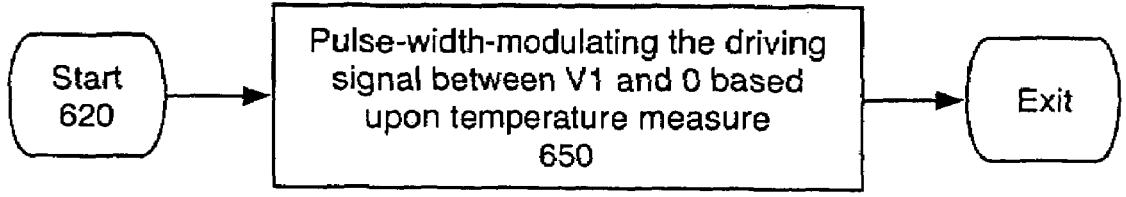

Forcing the driving signal 160 toward the first potential difference V1 may preferably include pulse-width-modulating the driving signal between the first potential difference and zero volts, preferably based upon the temperature measure 510, as in operation 650 of FIG. 12E.

Figure 12F:
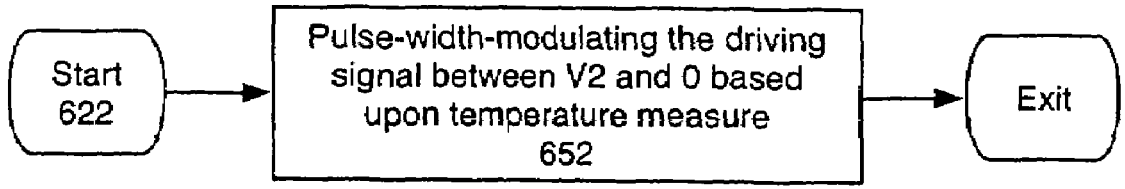

Forcing the driving signal toward the second potential difference V2 may preferably include pulse-width-modulating the driving signal between the second potential difference and zero volts, preferably based upon the temperature measure, as in operation 652 of FIG. 12F.

The invention includes the hard disk drive 10, including the thermoelectric device 200 providing the internal heat transfer interface 130 thermal-coupling to the internal thermal zone 20 and the exterior heat transfer interface 132 thermal-coupling with an exterior 300 of the hard disk drive.

The invention may preferably include the hard disk drive 10, containing the external cover 100 providing the intermediate thermal transfer interface 110 thermal-coupling to the internal thermal zone 20. The hard disk drive may further include the thermoelectric device 200 thermal-coupling to the transfer interface and to an exterior heat transfer interface 132 for heat transfers with an exterior 300 of the hard disk drive.

The invention includes a system 790 using at least one of the hard disk drive 10 as shown in FIG. 13A.

The system may include a thermal conduit 310 thermal-coupling to the exterior 300 of the hard disk drive as shown in FIG. 13B.

These systems include, but are not limited to, a Redundant Arrays of Inexpensive Disks 800 (RAID) as in FIG. 13C, a server computer 810 as in FIG. 13D, a desktop computer 820 as in FIG. 13E, and a notebook computer 830 as in FIG. 13F.

The invention includes manufacturing the system 790, including providing the hard disk drive 10 of the invention.

The manufacturing process may further include thermal coupling the thermal conduit 310 to the hard disk drive.

The system is the product of the manufacturing process.

The hard disk drive with both its disk base 14 and disk cover 16, each acting as an external cover 100, each possessing a intermediate thermal transfer interface 110, may be preferred in a system 790 supporting multiple hard disk drives, such as a RAID 800, because adjacent pairs of hard disk drives may share a thermal conduit 310, as shown in FIG. 13G. The manufacturing process may further include Using a second hard disk drive 10-2.

Thermal coupling the thermal conduit to the disk base of the hard disk drive.

And thermal coupling the disk cover of the second hard disk drive.

Figure 17B:
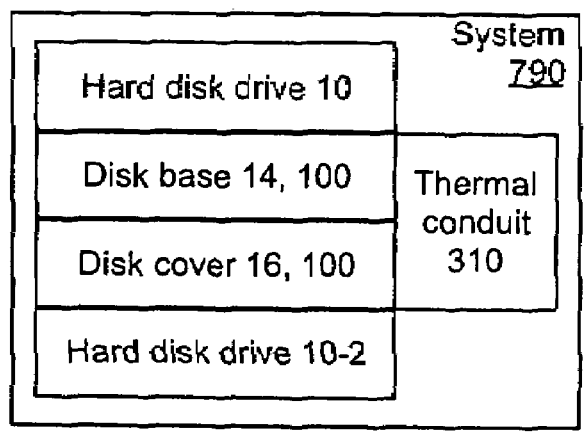
FIG. 17B show a further aspect of systems using the hard disk drives of the invention.

Alternatively, the system 790 may include one hard disk drive 10 with the disk base 14 as the external cover 100, and a second hard disk drive 10-2 with the disk cover 16 as its external cover, as shown in FIG. 17B. Such embodiments of the system are also useful when supporting multiple hard disk drives, such as a RAID 800, also allowing adjacent pairs of hard disk drives to share the thermal conduit 310. The manufacturing process is similar:

Using the hard disk drive.

Using the second hard disk drive.

Thermal coupling the thermal conduit to the disk base of the hard disk drive.

And thermal coupling the thermal conduit to the disk cover of the second hard disk drive.

Alternatively, the system 790 may include only the hard disk drive 10 using the disk base 14 as the external cover 100, as shown in FIG. 13H. Manufacturing this systems using this hard disk drive may preferably include:

Using the hard disk drive.

And thermal coupling the thermal conduit to the disk base of the hard disk drive.

Another alternative, the system 790 may include only the hard disk drive 10 using the disk cover 16 as the external cover 100, as shown in FIG. 13I. Manufacturing this systems using this hard disk drive may preferably include:

Using the second hard disk drive.

And thermal coupling the thermal conduit to the disk cover of the second hard disk drive.

The preceding embodiments provide examples of the invention and are not meant to constrain the scope of the following claims.

What is claimed is:

1. A method of controlling a thermoelectric device to affect a temperature of an internal thermal zone in a hard disk drive, comprising the steps:
applying a first potential difference between an electrical contact pair to enable a first heat transfer from an internal heat transfer interface included in a thermal interface to an exterior heat transfer interface thermally coupling to the exterior of said hard disk drive; wherein said thermal interface is thermally coupled to said internal thermal zone of said hard disk drive; and
applying a second potential difference between said electrical contact pair to enable a second heat transfer from said exterior heat transfer interface to said internal heat transfer interface;
wherein a sign of said first potential difference is an opposite of the sign of said second potential difference;
wherein the step applying said first potential difference, comprises the step:
forcing a driving signal toward said first potential difference between said electrical contact pair; and
wherein the step applying said second potential difference, comprises the step:
forcing said driving signal toward said second potential difference between said electrical contact pair.

2. The first heat transfer and said second heat transfer, as products of the process of claim 1.

3. The method of claim 1,
wherein the step applying said first potential difference, further comprises the step:
pulse-width-modulating said driving signal toward said first potential difference between said electrical contact pair; and
wherein the step applying said second potential difference, further comprises the step:
pulse-width-modulating said driving signal toward said second potential difference between said electrical contact pair.

4. The method of claim 1, further comprising the step:
receiving a temperature measure of said internal thermal zone;
wherein step applying said first potential difference, further comprises the step:
forcing said driving signal toward said first potential difference between said electrical contact pair, when said temperature measure is above a top operating temperature; and
wherein step applying said second potential difference, further comprises the step:
forcing said driving signal toward said second potential difference between said electrical contact pair, when said temperature measure is below a lower operating temperature.

5. A thermal controller implementing the method of claim 1, comprising:
means for applying said first potential difference between said electrical contact pair to enable said first heat transfer from said internal heat transfer interface to said exterior heat transfer interface; and
means for applying said second potential difference between said electrical contact pair to enable said second heat transfer from said exterior heat transfer interface to said internal heat transfer interface.

6. The thermal controller of claim 5, wherein said thermal controller receives a temperature measure of said internal thermal zone to create a driving signal;
wherein the means for applying said first potential difference, comprises:
first means for forcing said driving signal toward said first potential difference between said electrical contact pair, when said temperature measure is above a top operating temperature; and
wherein the means for applying said second potential difference, comprises:
second means for forcing said driving signal toward said second potential difference between said electrical contact pair, when said temperature measure is below a lower operating temperature.

7. The thermal controller of claim 5, comprising at least one member of the group consisting of:
at least one finite state machine generating a digital version of said driving signal;
at least one computer generating a second digital version of said driving signal;
a neural network generating a third digital version of said driving signal;
wherein said computer is accessibly coupled to a memory and directed by a program system including at least one program step residing in said memory;
wherein said computer includes at least one instruction processor and at least one data processor; wherein for each of said data processors, said data processor is directed by at least one of said instruction processors.

8. The thermal controller of claim 7,
wherein said finite state machine, further comprises: said finite state machine generating said digital version of said driving signal based upon a temperature measure of said internal thermal zone;
wherein said computer, further comprises: said computer generating said second of said digital versions of said driving signal based upon said temperature measure; and
wherein said neural network, further comprises: said neural network generating said third of said digital versions of said driving signal based upon said temperature measure.

9. The thermal controller of claim 7, wherein said program system includes at least one of the program steps:
forcing said second digital version of said driving signal toward said first potential difference; and
forcing said second digital version of said driving signal toward said second potential difference.

10. The thermal controller of claim 9,
wherein the program step forcing said second digital version of said driving signal toward said first potential difference, further comprises the program step:
pulse-width-modulating said second digital version of said driving signal toward said first potential difference; and
wherein the program step forcing said second digital version of said driving signal toward said second potential difference, further comprises the program step:
pulse-width-modulating said second digital version of said driving signal toward said second potential difference.

11. The thermal controller of claim 8, further comprising:
an analog circuit receiving at least one member of the analog input group to create said driving signal;
wherein said analog input group, consists of: said temperature measure, said digital version of said driving signal, said second digital version of said driving signal, and said third digital version of said driving signal.

12. The thermal controller of claim 6, further comprising:
an analog circuit receiving a temperature measure to create said driving signal, comprising:
means for forcing said driving signal toward said first potential difference between said electrical contact pair, when said temperature measure is above said top operating temperature; and means for forcing said driving signal toward said second potential difference between said electrical contact pair, when said temperature measure is below said lower operating temperature.

13. The thermal controller of claim 12, wherein said analog circuit, further comprising at least one instance of the group consisting of:
    a Digital to Analog Converter (DAC);
    an amplifier; and
    a voltage switcher.

14. A method of manufacturing said thermal controller of claim 5, comprising at least one step of the group consisting of the steps:
    providing said means for applying said first potential difference and said means for applying said second potential difference to at least partly create said thermal controller;
    providing
        a means for forcing a driving signal toward said first potential difference between said electrical contact pair, when a temperature measure is above a top operating temperature,
        a means for forcing said driving signal toward said second potential difference between said electrical contact pair, when said temperature measure is below a lower operating temperature
    to at least partly create said thermal controller;
    providing at least one finite state machine generating a digital version of said driving signal to at least partly create said thermal controller;
    providing at least one computer generating a second digital version of said driving signal to at least partly create said thermal controller;
    providing a neural network generating a third digital version of said driving signal to at least partly create said thermal controller;
    wherein said computer is accessibly coupled to a memory and directed by a program system including at least one program step residing in said memory;
    providing said program system in said memory to at least partly create said thermal controller;
    providing an analog circuit to at least partly create said thermal controller;
    wherein said analog circuit receives at least one member of the analog input group to create said driving signal;
    wherein said analog input group, consists of: said temperature measure, said digital version of said driving signal, said second digital version of said driving signal, and said third digital version of said driving signal.

15. The thermal controller as a product of the process of claim 14.

16. A thermoelectric device electrically coupling through said electrical contact pair to said thermal controller of claim 5 to enable said first heat transfer and said second heat transfer, and comprising:
    said internal heat transfer interface;
    said exterior heat transfer interface; and
    means for enabling power from said electrical contact pair for said first thermal transfer and for said second thermal transfer.

17. An external cover for said hard disk drive of claim 5, comprising:
    said thermal controller providing said driving signal to said electrical contact pair to direct a thermoelectric device in said first heat transfer and in said second heat transfer;
    wherein said thermoelectric device, comprises:
        said internal heat transfer interface included in said thermal interface for thermal-coupling to said internal thermal zone; and
        said exterior heat transfer interface for thermal-coupling to said exterior of said hard disk drive.

18. The hard disk drive of claim 5, comprising:
    said thermal controller providing said driving signal to said electrical contact pair to direct a thermoelectric device in said first heat transfer and in said second heat transfer;
    wherein said thermoelectric device, comprises:
        said internal heat transfer interface included in said thermal interface thermal-coupling to said internal thermal zone; and
        said exterior heat transfer interface thermal-coupling to said exterior of said hard disk drive.

19. A system, comprising: at least one of said hard disk drives of claim 18.

20. The system of claim 19, further comprising: a thermal conduit thermal-coupling to said exterior of said hard disk drive.

21. The system of claim 19, wherein said system acts as at least one of a Redundant Array of Inexpensive Disks (RAID), a server computer, a desktop computer, and a notebook computer.

* * * * *